US007672013B2

(12) United States Patent
Accad et al.

(10) Patent No.: US 7,672,013 B2
(45) Date of Patent: Mar. 2, 2010

(54) METHODS AND APPARATUS FOR ELECTRONICALLY TRAPPING DIGITAL IMAGES

(75) Inventors: Yigal Accad, Millbrae, CA (US); Richard Falk, San Rafael, CA (US); Mark Kelley, Belmont, CA (US)

(73) Assignee: Electroncics for Imaging, Inc., Foster City, CA (US)

( * ) Notice: Subject to any disclaimer, the term of this patent is extended or adjusted under 35 U.S.C. 154(b) by 1127 days.

(21) Appl. No.: 10/718,211

(22) Filed: Nov. 20, 2003

(65) Prior Publication Data

US 2005/0219631 A1 Oct. 6, 2005

(51) Int. Cl.
*G06F 15/00* (2006.01)

(52) U.S. Cl. ....................... 358/1.9; 358/518; 358/3.23; 358/3.04; 358/3.05; 358/3.11; 358/3.12; 382/167; 382/271; 382/272; 382/274; 382/205; 382/308

(58) Field of Classification Search ................. 358/1.9, 358/518, 3.26, 3.04–3.05, 3.11–3.12; 382/167, 382/274, 271–272, 205, 308
See application file for complete search history.

(56) References Cited

U.S. PATENT DOCUMENTS

| | | | | |
|---|---|---|---|---|
| 4,725,966 | A | 2/1988 | Darby et al. | |
| 5,542,052 | A * | 7/1996 | Deutsch et al. | 345/589 |
| 5,581,667 | A * | 12/1996 | Bloomberg | 358/1.9 |
| 5,848,224 | A * | 12/1998 | Nhu | 358/1.9 |
| 6,141,462 | A * | 10/2000 | Yoshino et al. | 382/284 |
| 6,345,117 | B2 * | 2/2002 | Klassen | 382/167 |
| 6,377,711 | B1 * | 4/2002 | Morgana | 382/274 |
| 6,549,303 | B1 | 4/2003 | Trask | |
| 6,556,313 | B1 | 4/2003 | Chang et al. | |
| 6,654,145 | B1 * | 11/2003 | Speck | 358/1.9 |
| 6,795,214 | B2 * | 9/2004 | Weinholz et al. | 358/1.9 |
| 6,813,042 | B2 * | 11/2004 | Hawksworth et al. | 358/1.9 |
| 6,844,942 | B2 * | 1/2005 | Rumph et al. | 358/1.9 |
| 6,970,271 | B1 * | 11/2005 | Estrada et al. | 358/1.9 |
| 7,116,821 | B2 * | 10/2006 | Lane et al. | 382/178 |
| 2001/0033686 | A1 | 10/2001 | Klassen | |
| 2001/0055130 | A1 * | 12/2001 | Geurts et al. | 358/530 |
| 2002/0051156 | A1 | 5/2002 | Weinholz et al. | |
| 2003/0011796 | A1 * | 1/2003 | Kohn | 358/1.9 |
| 2003/0053159 | A1 | 3/2003 | Ito | |
| 2003/0063302 | A1 * | 4/2003 | Munger et al. | 358/1.9 |
| 2003/0090689 | A1 | 5/2003 | Klassen | |
| 2003/0128377 | A1 * | 7/2003 | Ebner | 358/1.9 |

OTHER PUBLICATIONS

PCT/US2004/38000 Int'l Search Report & Written Opinion in Counterpart PCT Case , dated Apr. 8, 2005, Accad et al.
EP 04810949.0 Examination Report in Counterpart EP Case, dated Aug. 22, 2006, Accad et al.

* cited by examiner

*Primary Examiner*—Twyler L Haskins
*Assistant Examiner*—Jacky X Zheng
(74) *Attorney, Agent, or Firm*—Michael A. Glenn; Glenn Patent Group

(57) ABSTRACT

Methods and apparatus are provided for electronically trapping a selected digital color image pixel. A plurality of pixels that surround the selected pixel are identified, a colorant value of each of the surrounding pixels is compared with a corresponding colorant value of the selected pixel, one of the surrounding pixels is identified to control trapping of the selected pixel, and the selected pixel is trapped based on a relationship between a colorant value of the selected pixel and a corresponding colorant value of the identified controlling pixel.

12 Claims, 25 Drawing Sheets

|   |   | 154 | 154 | 154 | 154 | 154 |   |   |
|---|---|---|---|---|---|---|---|---|
|   | 154 | 154 | 154 | 154 | 154 | 154 | 154 |   |
| 154 | 154 | 154 | 154 | 154 | 154 | 154 | 154 | 154 |
| 154 | 154 | 154 | 154 | 154 | 154 | 154 | 154 | 154 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
|   | 0 | 0 | 0 | 0 | 0 | 0 | 0 |   |
|   |   | 0 | 0 | 0 | 0 | 0 |   |   |

|   |   | 16 | 13 | 12 | 13 | 16 |   |   |
|---|---|---|---|---|---|---|---|---|
|   | 15 | 10 | 9 | 7 | 9 | 10 | 15 |   |
| 16 | 10 | 6 | 4 | 3 | 4 | 6 | 10 | 16 |
| 13 | 9 | 4 | 1 | 0 | 1 | 4 | 9 | 13 |
| 12 | 7 | 3 | 0 | 0 | 0 | 3 | 7 | 12 |
| 13 | 9 | 4 | 1 | 0 | 1 | 4 | 9 | 13 |
| 16 | 10 | 6 | 4 | 3 | 4 | 6 | 10 | 16 |
|   | 15 | 10 | 9 | 7 | 9 | 10 | 15 |   |
|   |   | 16 | 13 | 12 | 13 | 16 |   |   |

94 90

| | | | | | | | | |
|---|---|---|---|---|---|---|---|---|
| | | 138 | 141 | 142 | 141 | 138 | | |
| | 139 | 144 | 145 | 147 | 145 | 144 | 139 | |
| 138 | 144 | 148 | 150 | 151 | 150 | 148 | 144 | 138 |
| 141 | 145 | 150 | 153 | 154 | 153 | 150 | 145 | 141 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| | 0 | 0 | 0 | 0 | 0 | 0 | 0 | |
| | | 0 | 0 | 0 | 0 | 0 | | |

FIG. 10

| | | | | | | | | |
|---|---|---|---|---|---|---|---|---|
| | | .80 | .84 | .86 | .84 | .80 | | |
| | .82 | .87 | .89 | .91 | .89 | .87 | .82 | |
| .80 | .87 | .93 | .95 | .96 | .95 | .93 | .87 | .80 |
| .84 | .89 | .95 | .98 | 1 | .98 | .95 | .89 | .84 |
| .86 | .91 | .96 | 1 | 1 | 1 | .96 | .91 | .86 |
| .84 | .89 | .95 | .98 | 1 | .98 | .95 | .89 | .84 |
| .80 | .87 | .93 | .95 | .96 | .95 | .93 | .87 | .80 |
| | .82 | .87 | .89 | .91 | .89 | .87 | .82 | |
| | | .80 | .84 | .86 | .84 | .80 | | |

FIG. 11

| | | | | | | | | |
|---|---|---|---|---|---|---|---|---|
| | | 154 | 154 | 154 | 154 | 0 | | |
| | 154 | 154 | 154 | 154 | 154 | 0 | 204 | |
| 0 | 0 | 0 | 0 | 0 | 0 | 0 | 204 | 204 |
| 0 | 0 | 0 | 0 | 0 | 0 | 0 | 204 | 204 |
| 0 | 0 | 0 | 0 | 0 | 0 | 0 | 204 | 204 |
| 0 | 0 | 0 | 0 | 0 | 0 | 0 | 204 | 204 |
| 0 | 0 | 0 | 0 | 0 | 0 | 0 | 204 | 204 |
| | 0 | 0 | 0 | 0 | 0 | 0 | 204 | |
| | | 204 | 204 | 204 | 204 | 204 | | |

FIG. 16

| | | | | | | | | |
|---|---|---|---|---|---|---|---|---|
| | | 138 | 141 | 142 | 141 | 0 | | |
| | 139 | 144 | 145 | 147 | 145 | 0 | 189 | |
| 0 | 0 | 0 | 0 | 0 | 0 | 0 | 194 | 188 |
| 0 | 0 | 0 | 0 | 0 | 0 | 0 | 195 | 191 |
| 0 | 0 | 0 | 0 | 0 | 0 | 0 | 197 | 192 |
| 0 | 0 | 0 | 0 | 0 | 0 | 0 | 195 | 191 |
| 0 | 0 | 0 | 0 | 0 | 0 | 0 | 194 | 188 |
| | 0 | 0 | 0 | 0 | 0 | 0 | 189 | |
| | | 188 | 191 | 192 | 191 | 188 | | |

FIG. 17

|   |   | F | F | F | F | F |   |   |
|---|---|---|---|---|---|---|---|---|
|   | F | F | F | F | F | F | F |   |
| T | T | T | T | T | T | F | F | F |
| T | T | T | T | T | T | F | F | F |
| T | T | T | T | T | T | F | F | F |
| T | T | T | T | T | T | F | F | F |
| T | T | T | T | T | T | F | F | F |
|   | F | F | F | F | F | F | F |   |
|   |   | F | F | F | F | F |   |   |

|   |   | B | B | B | B | B |   |   |
|---|---|---|---|---|---|---|---|---|
|   | B | B | 145 | 147 | 145 | B | B |   |
| 0 | 0 | 0 | 0 | 0 | 0 | B | B | B |
| 0 | 0 | 0 | 0 | 0 | 0 | 0 | B | B |
| 0 | 0 | 0 | 0 | 0 | 0 | 0 | B | B |
| 0 | 0 | 0 | 0 | 0 | 0 | 0 | B | B |
| 0 | 0 | 0 | 0 | 0 | 0 | 0 | B | B |
|   | B | B | 0 | 0 | 0 | B | B |   |
|   |   | B | B | B | B | B |   |   |

| Stage \ Clock Cycle | 1 | 2 | 3 | 4 | 5 |
|---|---|---|---|---|---|
| Δ Calculation | *i* | *i + 1* | *i + 2* | *i + 3* | *i + 4* |
| Trigger Calculation & Similar Calculation | *i - 1* | *i* | *i + 1* | *i + 2* | *i + 3* |
| Trigger Buffer & Beyond Determination | *i - 2* | *i - 1* | *i* | *i + 1* | *i + 2* |
| $T_{MAX}$ Determination | *i - 3* | *i - 2* | *i - 1* | *i* | *i + 1* |
| Trapping Determination | *i - 4* | *i - 3* | *i - 2* | *i - 1* | *i* |

FIG. 21B

METHODS AND APPARATUS FOR ELECTRONICALLY TRAPPING DIGITAL IMAGES

FIELD OF THE INVENTION

This invention relates to color image processing, particularly to methods and apparatus for electronically trapping digital color images to minimize image artifacts caused by mechanical registration errors in multiple separation color imaging devices.

BACKGROUND

Multiple-separation color imaging devices, such as color laser printers, copiers and offset printers, operate by transferring several image separations to a printing medium, such as paper, in stages. Each image separation is printed with a different colorant, such as ink or toner. For example, a four-color printer typically applies cyan (C), magenta (M), yellow (Y), and black (K) image separations during separate stages. These image separations can be created using a single drum for four-pass printers, or on four drums for in-line printers. The image separations can be transferred to an intermediate drum or belt, and then to the medium, or directly to the medium in four transfers.

Because the multiple image separations are created in separate mechanical steps, it is difficult to perfectly align the separations so that no gaps appear at edges between adjacent colors. Even very small gaps can form visible white lines in the printed image. Mechanical alignment of the image planes can reduce registration errors, but cannot completely eliminate such errors. Various techniques have been used to compensate for registration errors in multiple separation color imaging devices. Trapping is one such technique in which color areas in an image are intentionally overlapped so that small registration errors do not create visible gaps.

Previously known raster-based trapping techniques operate on images that have been first scanned or converted from a page description language to a sequence of high resolution scan lines, each line containing individual picture elements ("pixels"). Each pixel in each raster line is processed in sequence, and one or more adjacent pixels are compared to determine color boundaries. In particular, previously-known trapping processes typically perform the following steps: (1) identify edges in the image; (2) determine for each pair of colors on either side of the edge (a) whether trapping should be performed, (b) the color that should be used for the trapped pixels, and (c) where the color should be placed; and (3) modify the image accordingly.

In general, previously known raster-based trapping techniques utilize a "push" method, in which colorant value modifications are pushed from a trapping edge to many neighboring pixels along the edge. Referring to FIG. 1, an example of such a previously known push trapping technique is described. As shown in FIG. 1A, bitmap array 10 represents a segment of a composite image that includes multiple color separations. In particular, array 10 includes eleven rows and thirteen columns of pixels 12. Each pixel 12 has a corresponding color, comprised of a combination of the colorants used to depict the image. For example, in a CMYK printing process, each pixel 12 has a corresponding color that may be expressed as a combination of C, M, Y and K colorants. Array 10 includes pixels 12*a* having color D (corresponding to colorants $C_D$, $M_D$, $Y_D$ and $K_D$) and pixels 12*b* having color E (corresponding to colorants $C_E$, $M_E$, $Y_E$ and $K_E$). Edge 14 is formed at the border between pixels 12*a* and pixels 12*b*.

As shown in FIG. 1B, in conventional push trapping techniques, trapping zones 16 (above) and 18 (below) edge 14 are identified. The size of the trapping zones typically is determined based on measurements of misregistration on a specific imaging device. In the example shown in FIG. 1B, trapping zones 16 and 18 each have a trapping width of two pixels. After the trapping zones are identified, a decision is made whether to trap pixels in either or both of the trapping zones. Such a decision typically is based on a variety of factors, including the component colorant values of colors D and E, and differences between the component colorant values. In FIG. 1B, pixels 12*c* in trap zone 18 are trapped. In particular, all pixels 12*c* in trap zone 18 have their color E replaced by color E'.

A disadvantage of such previously known push trapping techniques is that they are computationally inefficient to implement in hardware image processing circuitry. In particular, such previously known techniques typically require that the pixel data are first processed to identify edges between adjacent regions, and then reprocessed to push trap colors in one or both directions perpendicular to each identified edge. If the image includes a large array of pixels (e.g., a letter size image at a resolution of 1,200 dots per inch may include more than 134 million pixels), such previously known trapping techniques may take a considerable amount of time to process.

In view of the foregoing, it would be desirable to provide methods and apparatus to efficiently trap digital color images.

It further would be desirable to provide methods and apparatus that allow multiple trapping operations to be performed in parallel.

It also would be desirable to provide methods and apparatus for trapping that may be efficiently implemented in hardware image processing circuitry.

SUMMARY

In view of the foregoing, it is an object of this invention to efficiently trap digital color images.

It further is an object of this invention to provide methods and apparatus that allow multiple trapping operations to be performed in parallel.

It also is an object of this invention to provide methods and apparatus for trapping that may be efficiently implemented in hardware image processing circuitry.

These and other objects of this invention are accomplished by providing methods and apparatus that electronically trap a selected digital color image pixel. In particular, methods and apparatus in accordance with this invention identify a plurality of pixels that surround the selected pixel. A colorant value of each of the surrounding pixels is compared with a corresponding colorant value of the selected pixel, and one of the surrounding pixels is identified to control trapping of the selected pixel. The selected pixel is trapped based on a relationship between a colorant value of the selected pixel and a corresponding colorant value of the identified controlling pixel. In this regard, the trap is pulled from the controlling pixel to the selected pixel.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which:

FIG. 10 illustrates the trigger values of FIG. 8 adjusted by the distance-based offset values of FIG. 9;

FIG. 11 illustrates exemplary distance-based scale factors in accordance with this invention;

FIG. 16 illustrates exemplary trigger values of the region of interest of FIG. 15 in accordance with this invention;

FIG. 17 illustrates the trigger values of FIG. 16 adjusted by the distance-based offset values of FIG. 9;

FIG. 21B is an exemplary timing diagram of the circuit of FIG. 21A; and

DETAILED DESCRIPTION

Figure 1A:
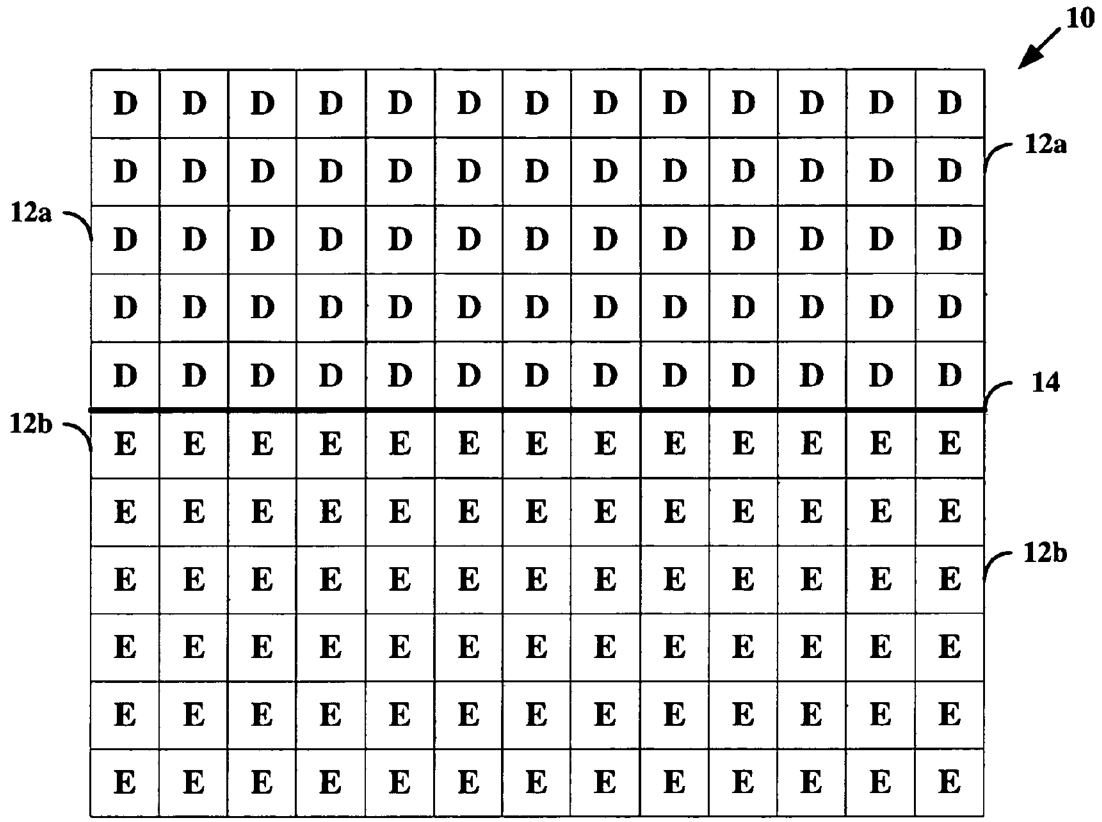
FIG. 1A illustrates an exemplary bitmap array of image data.
Figure 1B:
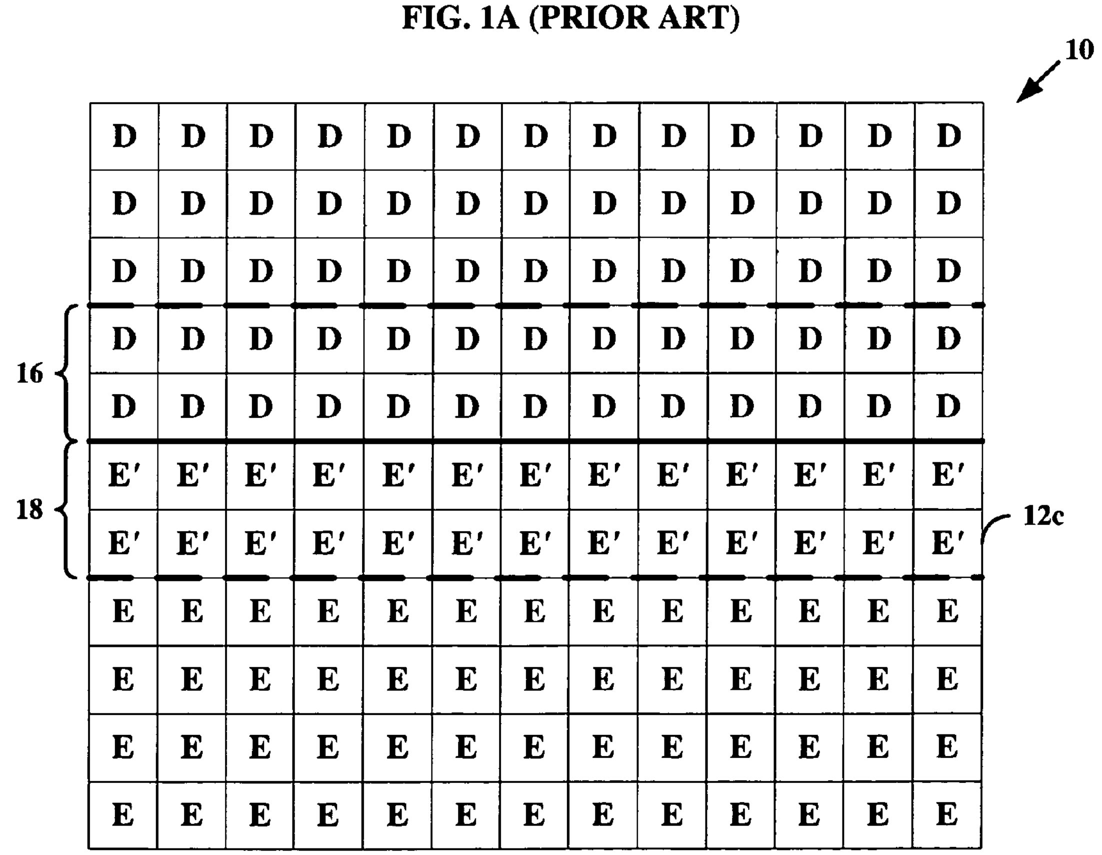
FIG. 1B illustrates a previously known trapping technique of the bitmap array of FIG. 1A.
Figure 2:
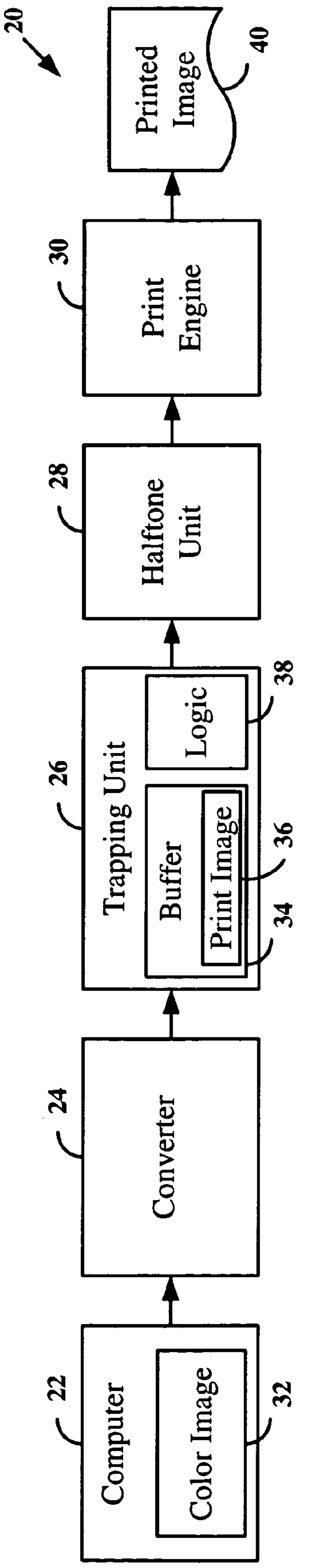
FIG. 2 is a block diagram of an exemplary printing system in accordance with this invention.

Referring to FIG. 2, an exemplary printing system that implements pull trapping techniques in accordance with this invention is described. Printing system 20 includes computer 22, converter 24, trapping unit 26, halftone unit 28 and print engine 30. Computer 22 may be a personal computer, workstation, server, mainframe, image copier, image scanner, digital camera, or other similar digital image device. Computer 22 includes color image data 32 that may be stored in computer memory (not shown) or may be generated by an application program (not shown) running on the computer. Color image data 32 may be red, green, blue ("RGB") data, CMYK data, or other type of image data.

Converter 24 may be used to convert color image data 32 into print image data 36 for output to trapping unit 26. For example, if color image data 32 are RGB data, converter 24 may convert the RGB data to CMYK data. Alternatively, if color image data 32 are CMYK data in a first color space, converter 24 may convert the data to CMYK data in a second color space. Methods and apparatus for converting RGB data to CMYK data, and CMYK data to CMYK data are well known, and typically include the use of one or more color conversion tables (not shown). Persons of ordinary skill in the art will understand that color image data 32 may be represented in a color space other than RGB or CMYK, and that converter 24 may convert the data to a color space other than CMYK. In addition, color image data 32 may not require any conversion (e.g., color image data 32 in computer 22 may be CMYK data that has already been converted to the color space of print engine 30). In such cases, converter 24 optionally may be removed from printing system 20, and computer 22 may be coupled directly to trapping unit 26.

Converter 24 provides print image data 36 to trapping unit 26. In an exemplary embodiment of this invention, print image data 36 includes a bitmap array of pixels, wherein each pixel has associated multiple colorant values that define the amount of each colorant to be applied to a corresponding area or region on print media. For example, if print engine 30 is a four color CMYK engine, each pixel of print image data 36 has C, M, Y and K data values. Colorant values typically are represented as multi-bit digital data values. Thus, if eight bits are used for each colorant, the colorant values may range from 0-255. In this regard, 0 corresponds to no colorant, and 255 corresponds to 100% colorant. Persons of ordinary skill in the art will understand that more than or less than 8 bits may be used for each colorant, and that print image data 36 may also include additional data, such as data identifying the object type (e.g., background, text, graphics, or raster data) associated with each pixel.

Exemplary trapping unit 26 includes buffer 34 for storing print image data 36, and logic 38, described in more detail below, for implementing pull trapping techniques of this invention. Buffer 34 and logic 38 may be implemented together, such as in integrated circuitry, or may be implemented in separate hardware and/or software. Buffer 34 may be any conventional memory device, such as random access memory, read-only memory, optical memory, floppy disk, hard disk, field programmable gate array or other similar memory device.

Trapping unit 26 may be implemented in hardware, software, firmware, or any combination thereof. Persons of ordinary skill in the art will recognize that a purely software-based configuration may be employed using an associated processor (not shown) and memory. In such a configuration, the processor would be configured to operate in accordance with software instructions that implement all or part of trapping processes described herein. The software instructions may be provided via any applicable computer readable media or signal, such as, magnetically-read media, optically read media, solid state logic or memory, transmitted signal, or other similar media or signal.

Trapping unit 26 provides print image data 36 to halftone unit 28, which performs half-tone processing, and provides the resulting data to print engine 30. Print engine 30, which may be a color laser printer, color photocopier, printing press, or any similar multiple-stage printer unit, uses the information contained in the received print image data to selectively apply appropriate amounts of colorants, such as C, M, Y and K colorants, to a print medium to form a corresponding plane of printed image 40. Print engine 30 has an average mechanical misregistration equivalent to h horizontal pixels and v vertical pixels. Persons of ordinary skill in the art will understand that print engine 30 may include fewer than four colorants and may include colorants in place of or in addition to CMYK colorants. Persons of ordinary skill in the art also will understand that some print engines 30, such as higher-end laser printers and copiers, receive digital print image data and internally perform half-toning. Thus, halftone unit 28 may be unnecessary in such printing systems, and optionally may be removed from printing system 20.

Persons of ordinary skill in the art also will understand that although described and depicted separately, one or more of computer 22, converter 24, trapping unit 26, halftone unit 28 and print engine 30 may be combined or implemented in one or more devices. Thus, for example, one or more of the functions performed by converter 24, trapping unit 26, and halftone unit 28 may be performed by computer 22. Similarly, the functions of computer 22, converter 24, trapping unit 26, halftone unit 28 and print engine 30 may be combined into a single printer device. Further, computer 22, converter 24, trapping unit 26, halftone unit 28 and print engine may be located together, or may be distributed over multiple areas, such as in a networked printing system. All such possibilities are within the scope of this invention.

Figure 3:
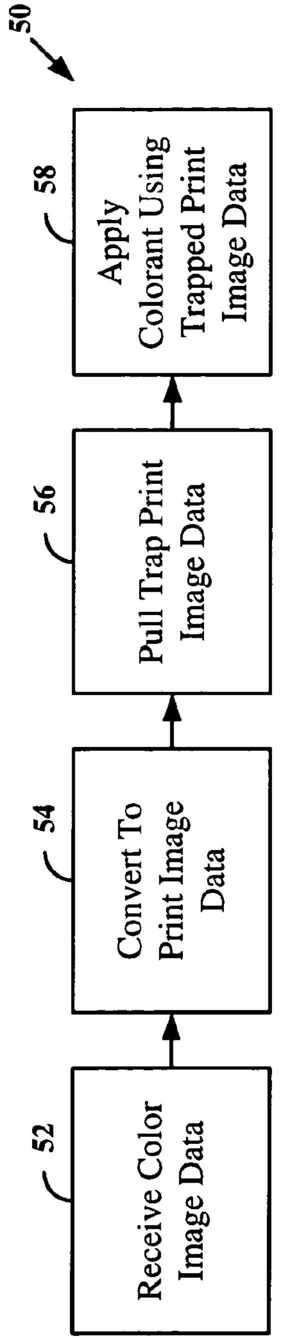
FIG. 3 is a block diagram of an exemplary printing process in accordance with this invention.

Referring now to FIG. 3, an exemplary printing process 50 including pull trapping techniques in accordance with this invention is described. Beginning at step 52, color image data 32 are received. At step 54, color image data 32 are converted to corresponding print image data 36 that are suitable for printing. For example, if color image data 32 are RGB data, the data may be converted to CMYK print image data 36. At step 56, print image data 36 are trapped using pull trapping techniques in accordance with this invention. At step 58, the trapped print image data may be further processed (e.g., half-toning) and then colorants are selectively applied to a print medium based on the values of the pixel data from step 56.

Figure 4:
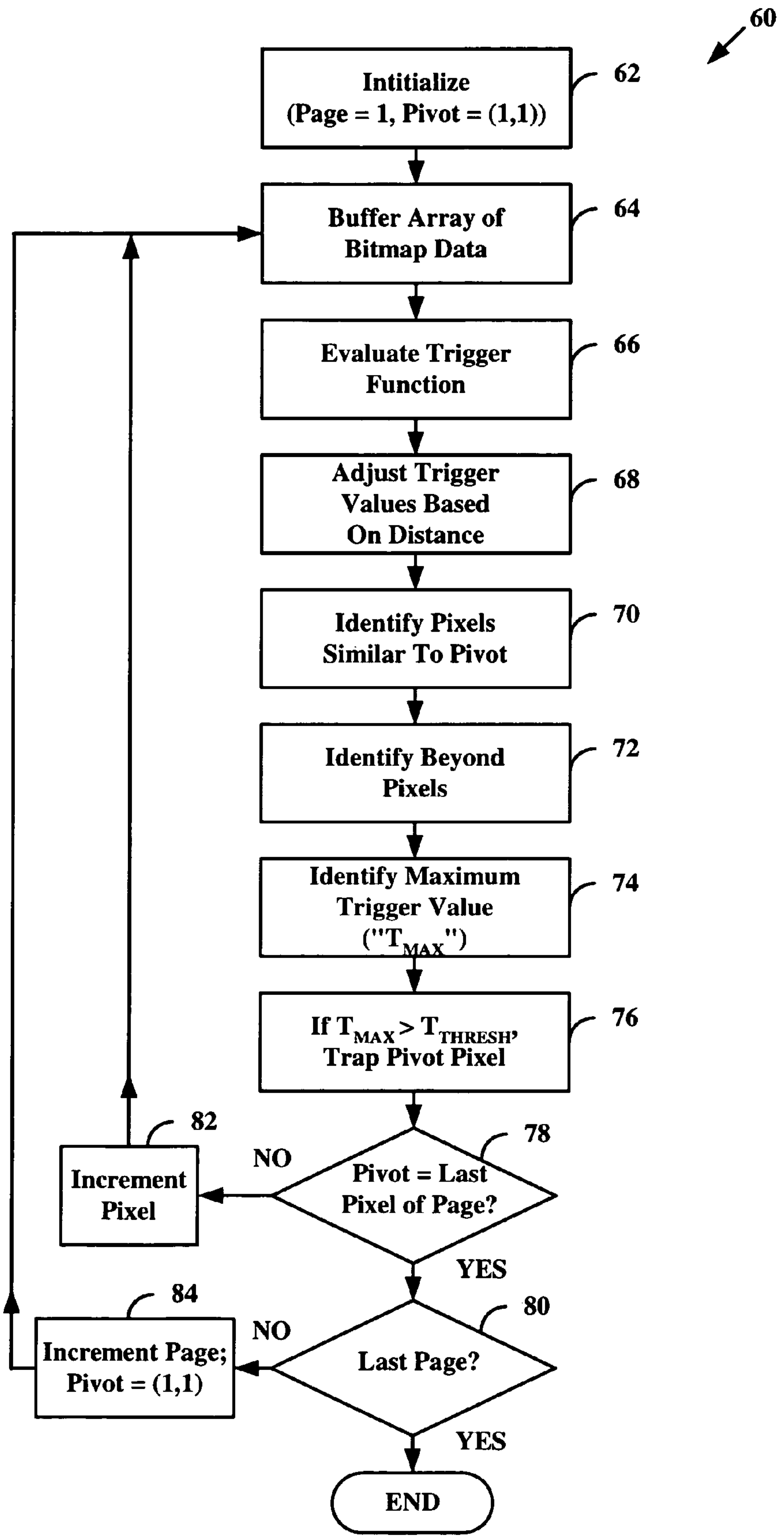
FIG. 4 is a block diagram of an exemplary pull trapping process in accordance with this invention.

Referring now to FIG. 4, an exemplary pull trapping process 60 in accordance with this invention is described. In general, print image data 36 includes data for multiple pages, with each page represented by a two-dimensional raster array. Beginning at step 62, the process initializes to the first pixel on the first page (e.g., page 1, pixel (1,1),) that will be evaluated for trapping, referred to herein as the "pivot pixel." Next, at step 64, an array of print image data 36 are buffered. In particular, the pivot pixel and additional pixels surrounding the pivot pixel, collectively referred to herein as the "region of interest" ("ROI"), are buffered. The region of interest is identified using a trapping window that includes an array of pixels (i, j) that satisfies the inequality:

$$\left(\frac{\Delta j}{a}\right)^2 + \left(\frac{\Delta i}{b}\right)^2 \leq 1 \quad (1)$$

Equation (1) describes an elliptically-shaped trapping window, where a and b are the horizontal and vertical pixel dimensions, respectively, of the trapping window, and Δj and Δi are the horizontal and vertical displacements, respectively, measured from the edge of the square border at the center pixel of the trapping window. Mechanical misregistration typically occurs in both horizontal and vertical dimensions. In general, the amount of misregistration in one direction may differ from the amount in the other direction. For example, an imaging device may have a mechanical misregistration equivalent to h=2 horizontal pixels, and v=3 vertical pixels. To compensate for such misregistration, trapping methods and apparatus in accordance with this invention use elliptically-shaped trapping windows. Persons of ordinary skill in the art will understand that a circularly-shaped trapping window is a subset of such elliptically-shaped trapping windows, and may be used where a particular imaging device has equal horizontal and vertical misregistration.

Referring to FIGS. 5A-5J, exemplary trapping windows are described. In particular, FIGS. 5A-5D illustrate trapping windows that are approximately circular in shape, whereas FIGS. 5E-5J illustrate trapping windows that are approximately elliptical in shape. The center pixel of each trapping window is shown with cross-hatched markings. Table 1 illustrates the width a and height b of the exemplary trapping windows in FIGS. 5A-5J.

TABLE 1

| FIG. | a | b |
|---|---|---|
| 5A | 1 | 1 |
| 5B | 2 | 2 |
| 5C | 3 | 3 |
| 5D | 4 | 4 |
| 5E | 2 | 1 |
| 5F | 1 | 2 |
| 5G | 3 | 2 |
| 5H | 2 | 3 |
| 5I | 2 | 4 |
| 5J | 4 | 2 |

The specific trapping used depends on the desired misregistration compensation. For example, if it is determined that the misregistration of printer 30 requires a trapping width of two horizontal pixels and three vertical pixels, the trapping window of FIG. 5H would be selected. Persons of ordinary skill in the art will understand that trapping windows of other shapes and dimensions may be used in accordance with this invention. For example, square and rectangular trapping windows may be used, and trapping windows that are smaller or larger than those shown in FIGS. 5A-5J may be used.

Figure 6:
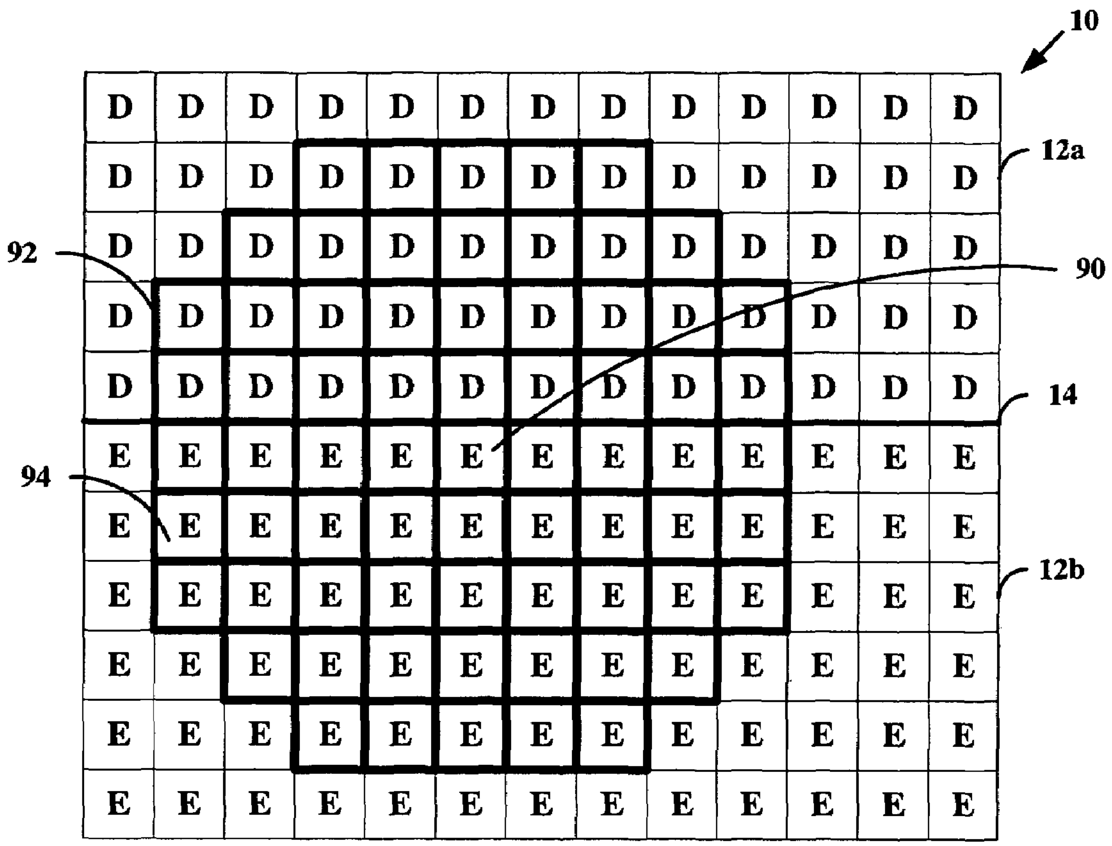
FIG. 6 illustrates an exemplary data buffering step in accordance with this invention.

Referring now to FIG. 6, an array of buffered data selected in accordance with step 64 is described. Array 10 is an exemplary portion of print image data 36. For purposes of illustration, pivot pixel 90 in this example is located at row 6, column 6 of array 10. A circular shaped trapping window 92, with a=4 and b=4, is aligned with pivot pixel 90, and defines region of interest 94 that straddles edge 14 between pixels 12*a* having color D and pixels 12*b* having color E. Note that if pivot pixel 90 is located near a periphery of print image data 36 (e.g., if pivot pixel 90 is located at row 1, column 1 of array 10), trapping window 92 may extend beyond the periphery. In such cases, the pixels in trapping window 92 that extend beyond the periphery may be assumed to be white (i.e., C=M=Y=K=0), or may be assumed to have the same color values as the pixels on the image periphery, or may be assumed to have any other color values that will prevent artificial trapping at the image periphery.

Referring again to FIG. 4, at step 66, a function is evaluated for each pixel in the region of interest. In particular, the function, referred to herein as a "trigger function," has two purposes: to detect edges between adjacent color regions in print image data 36 that have trapping significance, and to quantify the need for trapping in such cases. With regard to the first purpose, an edge between two different color values has trapping significance when one set of colorant values of pixels moves in opposite direction from a different set of colorant values of pixels.

For example, if pixels on a first side of an edge have colorant values C=100, M=80, Y=0, K=0, and pixels on a second side of the edge have colorant values C=150, M=110, Y=70, K=50, such an edge is not of trapping significance because the colorant values move in the same direction from the first side to the second side (i.e., all colorant values increase). If, however, pixels on a first side of an edge have colorant values C=100, M=0, Y=0, K=0, and pixels on a second side of the edge have colorant values C=0, M=110, Y=0, K=0, such an edge is of trapping significance because the colorant values on the first side of the edge move in opposite direction from colorant values on the second side of the edge (i.e., the C value increases while the M value decreases). In the event of a misregistration between the C and M colorant planes, a visible white gap may form between the two regions, which may be objectionable.

As described above, the trigger function also serves to quantify the need for trapping. A numerical value may be calculated to determine the need for trapping on an edge. An exemplary trigger function that may be used to detect the location of edges between adjacent color regions and quantify the need for trapping at such edges is:

$$\text{Trigger}(x) = \sum_{\text{all colorants}} |\Delta I(x)| - \left| \sum_{\text{all colorants}} \Delta I(x) \right| \tag{2}$$

where Trigger(x) is the trigger value of pixel x, x is a pixel in the region of interest, I(x) is the data value of colorant I of pixel x, ΔI(x) is the colorant difference of pixel x, ΔI(x)=I(x)−I(pivot pixel), and each summation is performed over all colorants that are used in the printing system. For example, in a CMYK printing system, the exemplary trigger function of equation (2) may be written as:

$$Trigger(x)=|\Delta C(x)|+|\Delta M(x)|+|\Delta Y(x)|+|\Delta K(x)|-|\Delta C(x)+\Delta M(x)+\Delta Y(x)+\Delta K(x)| \tag{3}$$

where the colorant differences are given by:

$$\Delta C(x)=C(x)-C(pivot\ pixel)$$

$$\Delta M(x)=M(x)-M(pivot\ pixel)$$

$$\Delta Y(x)=Y(x)-Y(pivot\ pixel)$$

$$\Delta K(x)=K(x)-K(pivot\ pixel) \tag{4}$$

Note that the trigger function of equation (2) need not be evaluated for the pivot pixel. Persons of ordinary skill in the art will understand other trigger functions also may be used.

Figure 7:
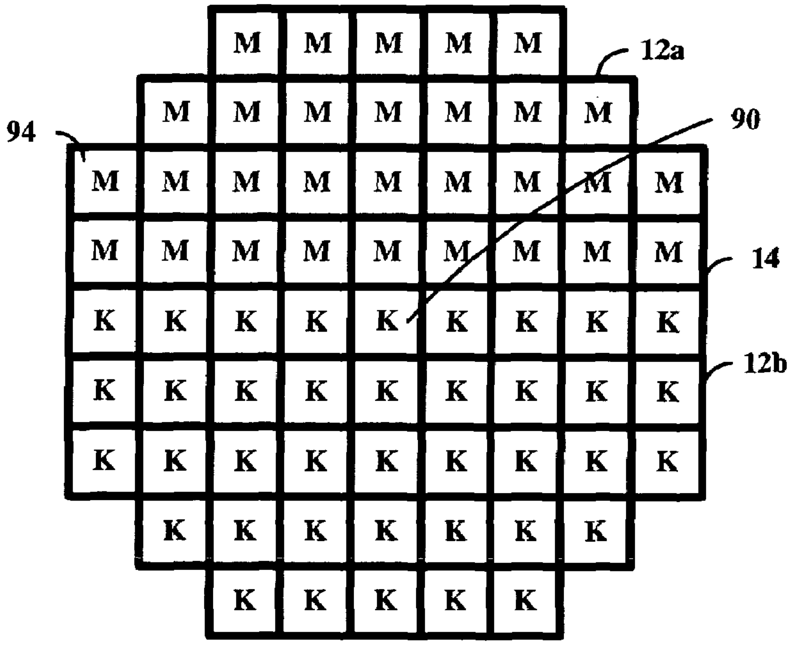
FIG. 7 illustrates an exemplary region of interest in accordance with this invention.
Figure 8:
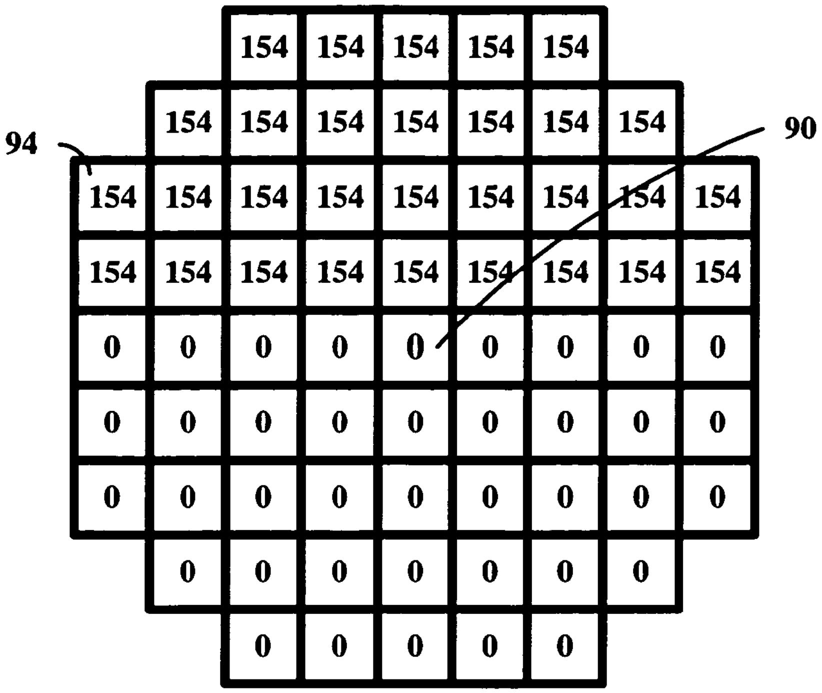
FIG. 8 illustrates exemplary trigger values of the region of interest of FIG. 7 in accordance with this invention.

FIGS. 7 and 8 illustrate exemplary colorant values and corresponding trigger values in region of interest 94, calculated using the exemplary trigger function of equation (2) and pivot pixel 90. Region of interest 94 includes M pixels 12*a* (C=0, M=77, Y=0, K=0), and K pixels 12*b* (C=0, M=0, Y=0, K=128), which includes pivot pixel 90. From equation (2), the trigger value relative to pivot pixel 90 for each M pixel is 154, and the trigger value relative to pivot pixel 90 for each K pixel is 0.

Figure 9:
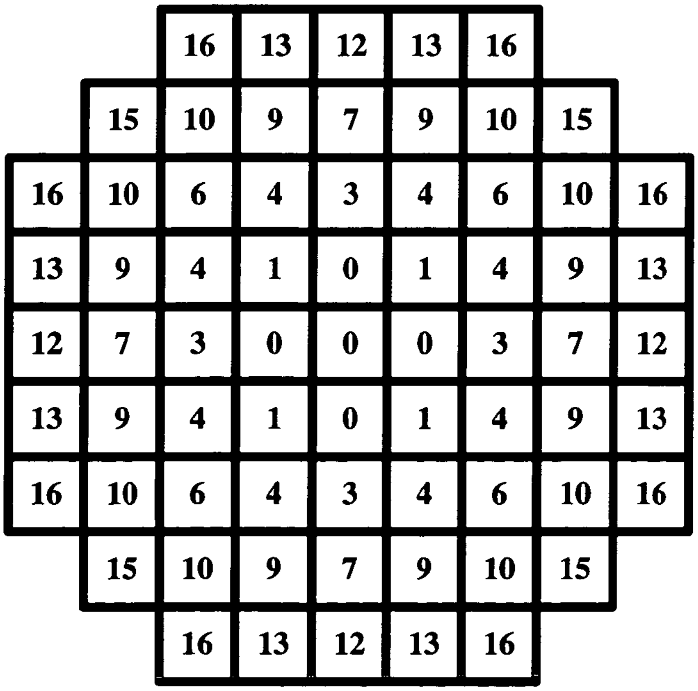
FIG. 9 illustrates exemplary distance-based offset values in accordance with this invention.

Referring again to FIG. 4, at step 68, each trigger value is adjusted according to its distance from pivot pixel 90. In particular, pixels farther from the pivot pixel should have less affect than pixels closer to the pivot pixel when determining the location and relative trapping significance of a nearby edge. To achieve this goal, the trigger values are adjusted based on distance from the pivot pixel. One exemplary method for adjusting the trigger values is to subtract a distance-based offset value from each trigger value in the region of interest:

$$Trigger_D(x)=Trigger(x)-Offset(x) \tag{5}$$

where $Trigger_D(x)$ is a distance-adjusted trigger value of pixel x and Offset(x) is a distance-based offset function of pixel x. The values of Offset(x) preferably substantially monotonically increase with increasing distance from the pivot pixel. FIG. 9 illustrates exemplary values of Offset(x) for region of interest 94, and FIG. 10 illustrates corresponding distance-adjusted trigger values for region of interest 94.

Persons of ordinary skill in the art will understand that other values may be used for Offset(x), and that other methods may be used for adjusting trigger values based on distance from the pivot pixel. For example, an alternative exemplary method for adjusting the trigger values is to multiply each trigger value in the region of interest by a distance-based scale factor:

$$Trigger_D(x)=Trigger(x)\times Scale(x) \tag{6}$$

where Scale(x) is a distance-based function of pixel x. The values of Scale(x) preferably substantially monotonically decrease with increasing distance from the pivot pixel. FIG. 11 illustrates exemplary values of Scale(x) for region of interest 94. Persons of ordinary skill in the art will understand that other values may be used for Scale(x).

Referring again to FIG. 4, at step 70, pixels that are similar to the pivot pixel are identified, because such pixels are immaterial to the trapping decision. In particular, a pixel x in the region of interest is similar to the pivot pixel if the absolute value of all colorant differences are less than or equal to a threshold value, referred to herein as a similar threshold, $T_{SIM}$:

$$|\Delta I(x)| \leqq T_{SIM} \text{ for all colorants} \tag{7}$$

Figure 12:
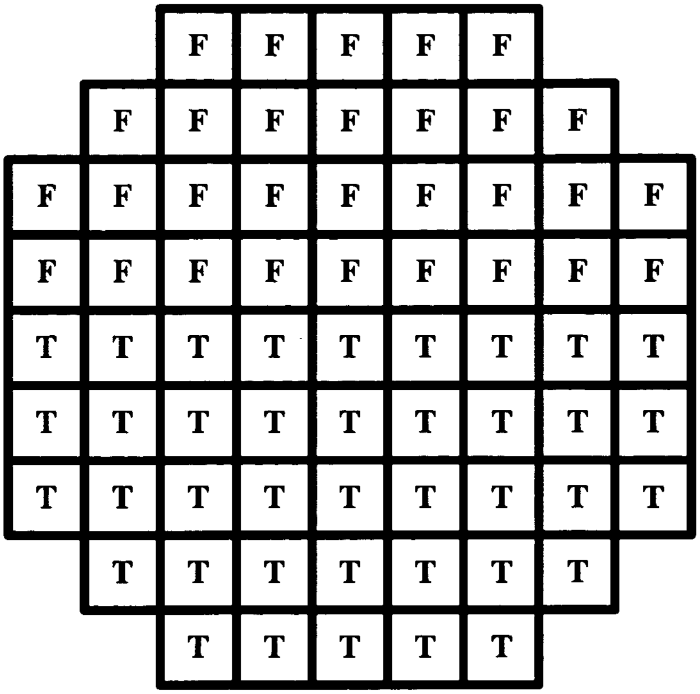
FIG. 12 illustrates exemplary similar flags for the region of interest of FIG. 8 in accordance with this invention.

An exemplary value of $T_{SIM}$ is 1.5% of a full scale value. Thus, in an 8-bit system, $T_{SIM}$=4(4÷255≈1.5%). For each pixel in the region of interest, a "similar" flag may be set based on the results of equation (7). That is, the similar flag is true ("T") if equation (7) is satisfied, and is false ("F") otherwise. FIG. 12 illustrates similar flags for the pixels of region of interest 94, using $T_{SIM}$=4.

Referring again to FIG. 4, at step 72, pixels in the region of interest are identified that should be removed from consideration from the trapping process. There are two reasons for removing such pixels: First, the trapping decision for the pivot pixel should be based on the colorant values of pixels closest to the edge. Although trigger values are adjusted based on distance from the pivot pixel, pixels farther from an edge may nevertheless have distance-adjusted trigger values greater than the trigger values of pixels closer to the edge. Second, a trap should not be permitted to jump a barrier, such as a white space, between colored regions.

With regard to the first goal, each pixel that has a distance-adjusted trigger value that exceeds $T_{THRESH}$, referred to herein as a "Significant Pixel," indicates the existence of an edge that may require trapping. The value of $T_{THRESH}$ is used to determine where the need for trapping is sufficiently great. For example, the value of $T_{THRESH}$ may be set to 12.5% of a full scale value. In an 8-bit system, $T_{THRESH}$=32 (32÷255≈12.5%). Persons of ordinary skill in the art will understand that other values of $T_{THRESH}$ alternatively may be used. To ensure that the trapping decision for the pivot pixel is based on the colorant values of pixels closest to an edge, pixels are removed from consideration that are "beyond" Significant Pixels. With regard to the second goal, pixels that have a false similar flag, referred to herein as "False Similar Pixels," may indicate the existence of a barrier between colored regions. To ensure that a trap does not jump a barrier, pixels are removed from consideration that are beyond False Similar Pixels.

Pixels in the region of interest that are farther away from Significant Pixels and False Similar Pixels are classified as "beyond pixels." The beyond pixels collectively form a portion of the region of interest referred to herein as the "beyond region." The beyond region of a pixel X may be identified as follows. A first imaginary line is drawn that connects the pivot pixel and pixel X. Next, a second imaginary line is drawn perpendicular to the first imaginary line and passing through pixel X. The beyond region includes the pixels on the side of the second imaginary line that is farther the pivot pixel. In addition, each beyond region is monotonic. That is, if pixel X is in the beyond region of pixel Z, pixel B is in the beyond region of pixel X if pixel B is also in the beyond region of pixel Z.

Figure 5A:
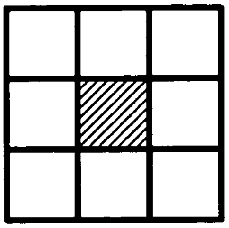
FIGS. 5A-5J are diagrams of exemplary trapping windows in accordance with this invention.
Figure 5B:
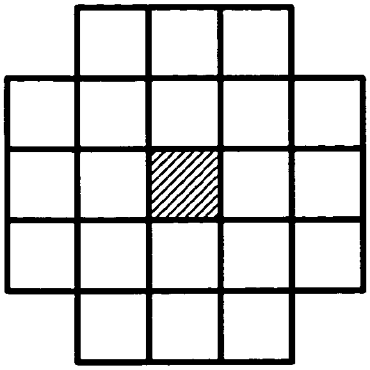
Figure 5C:
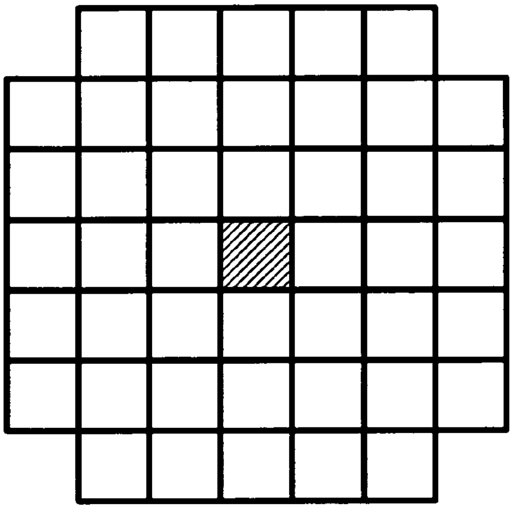
Figure 5D:
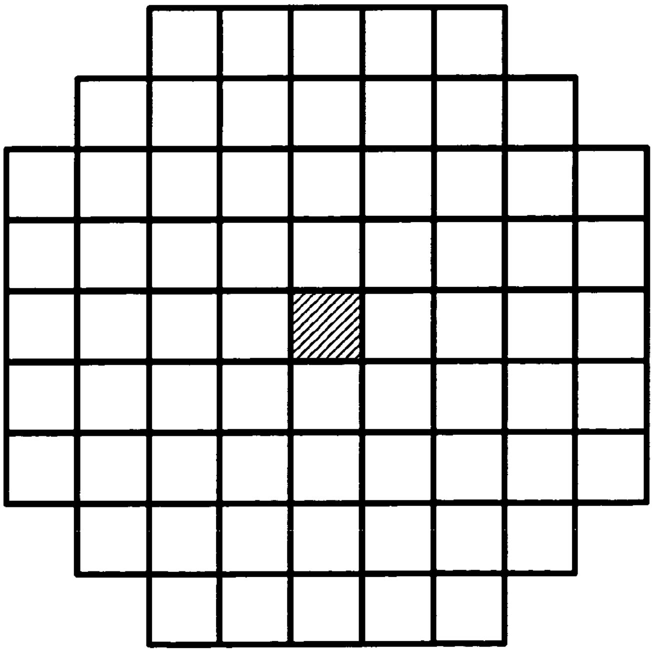
Figure 5E:
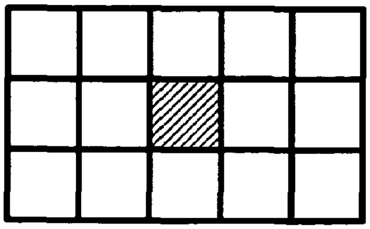
Figure 5F:
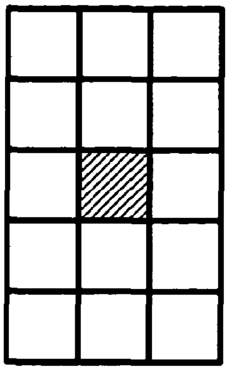
Figure 5G:
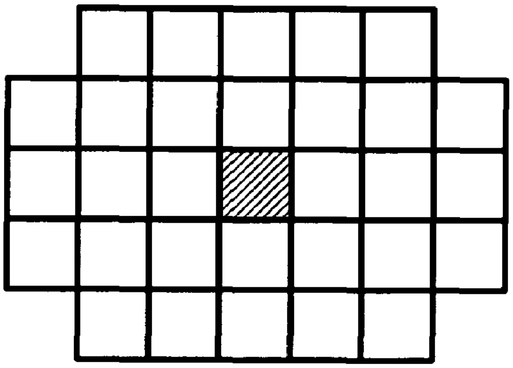
Figure 5H:
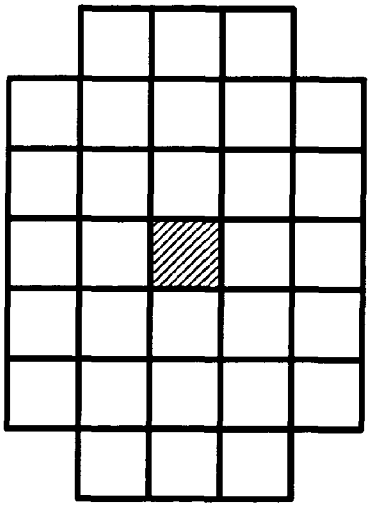
Figure 5I:
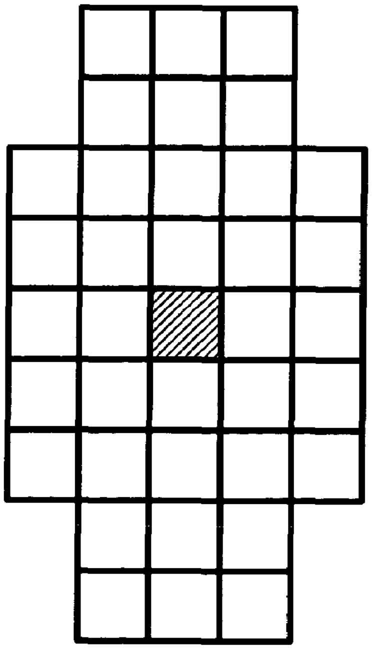
Figure 5J:
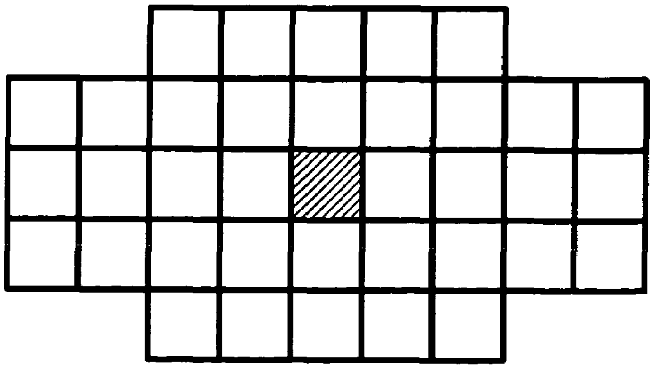
Figure 13A:
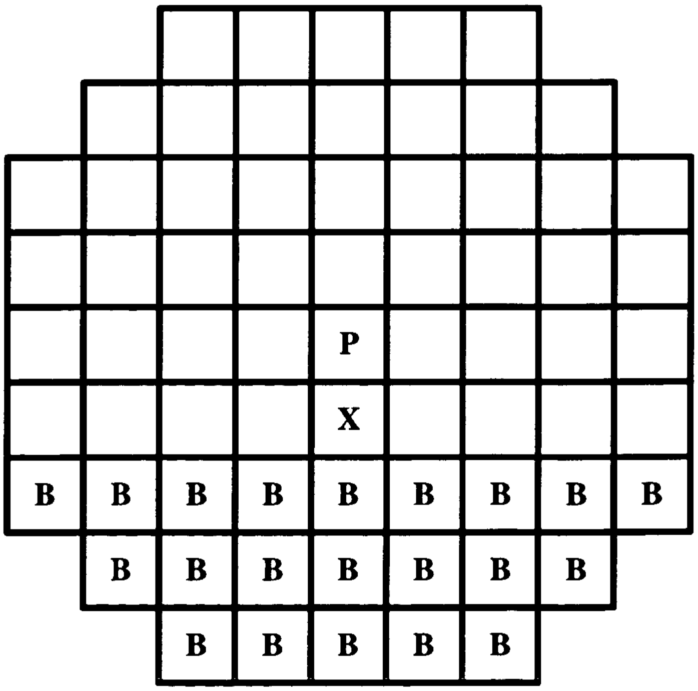
FIGS. 13A-13Q illustrate exemplary beyond regions for the trigger window of FIG. 5D.
Figure 13B:
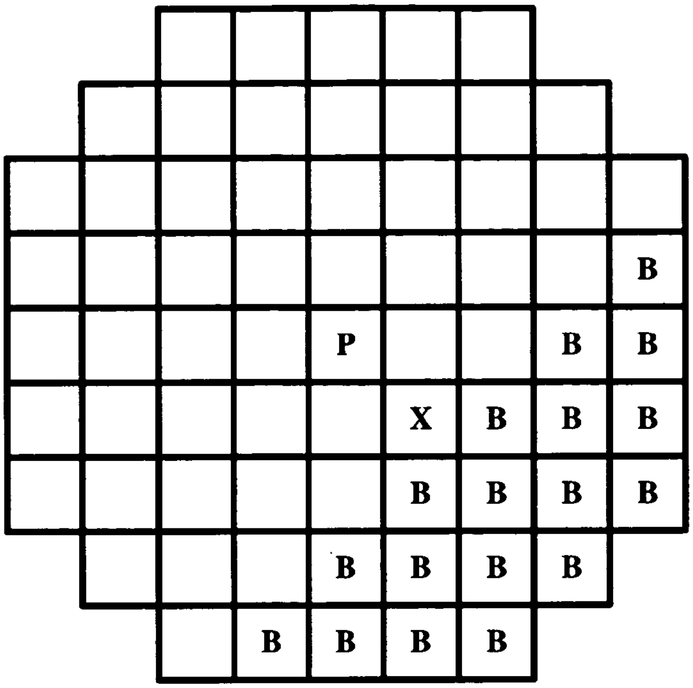
Figure 13C:
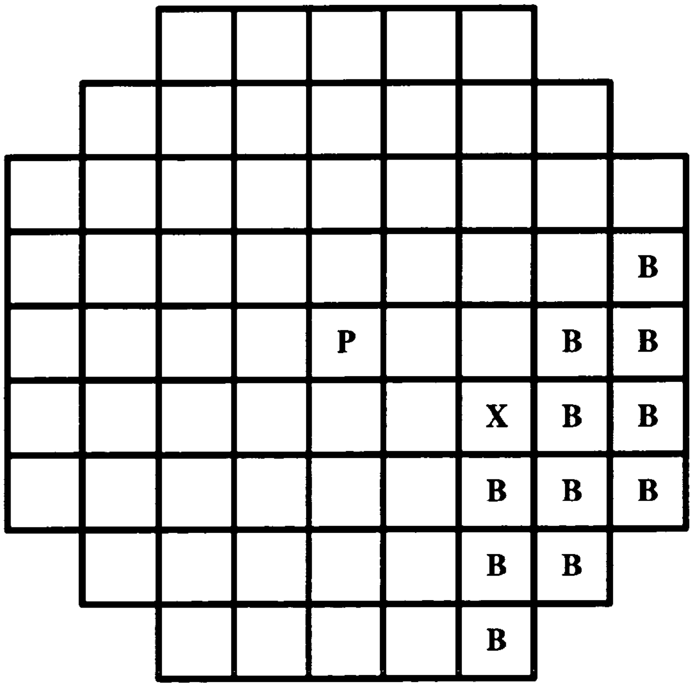
Figure 13D:
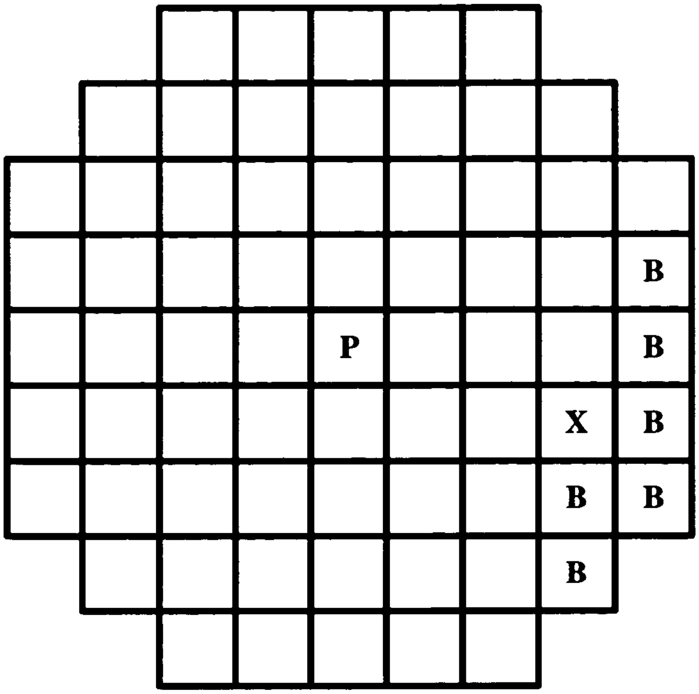
Figure 13E:
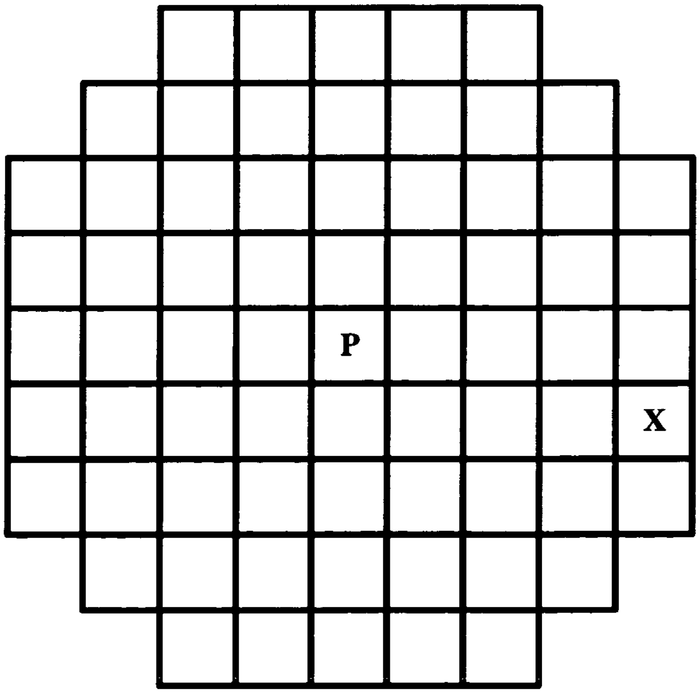
Figure 13F:
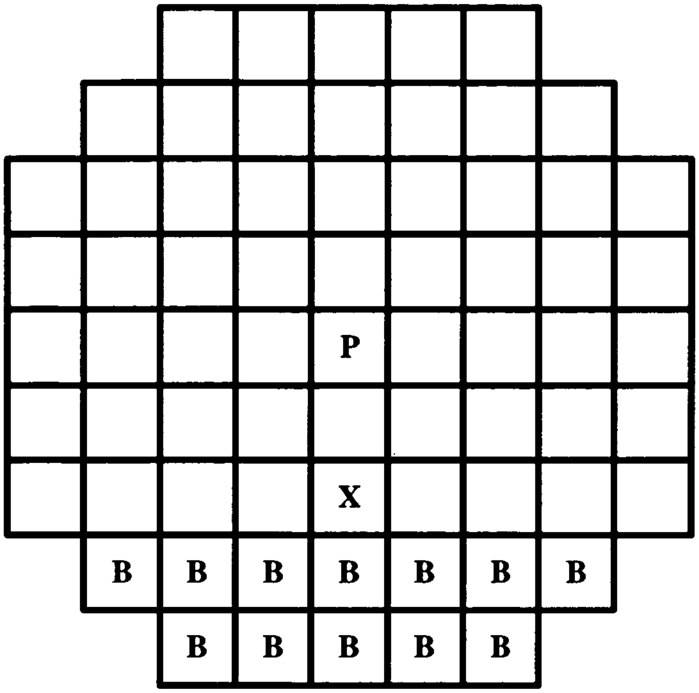
Figure 13G:
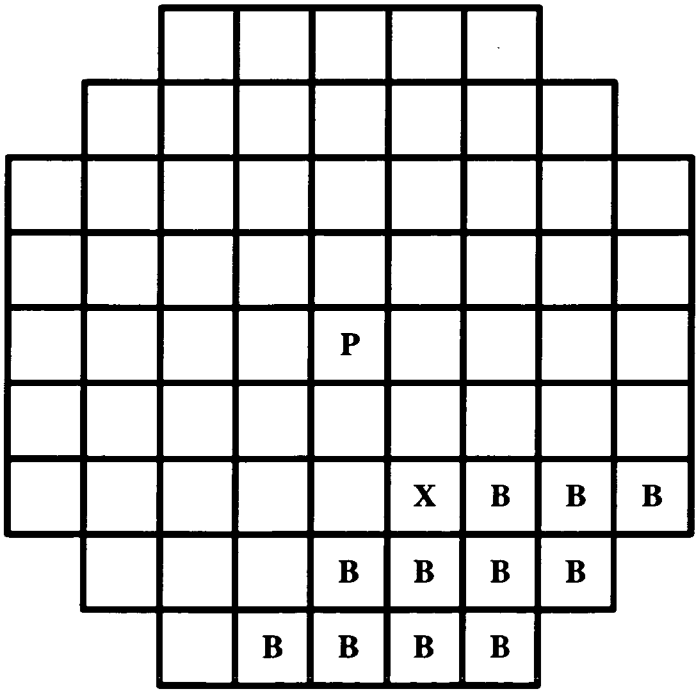
Figure 13H:
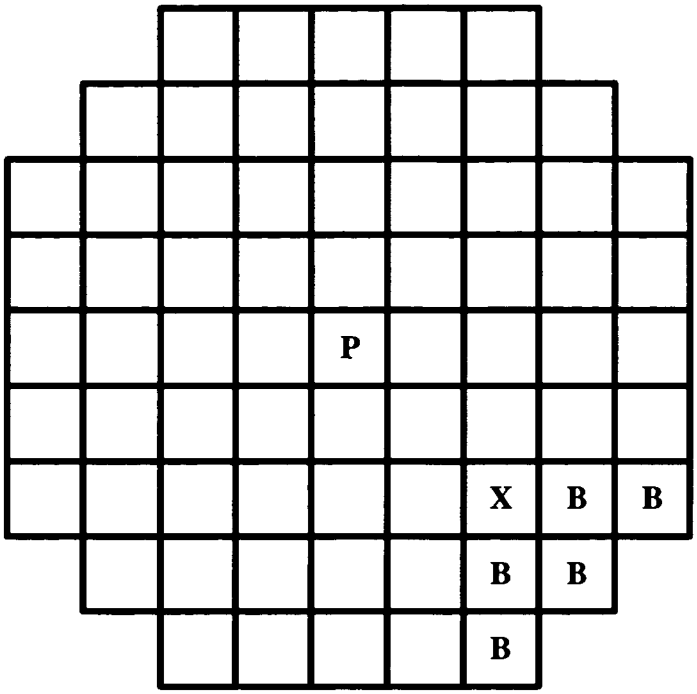
Figure 13I:
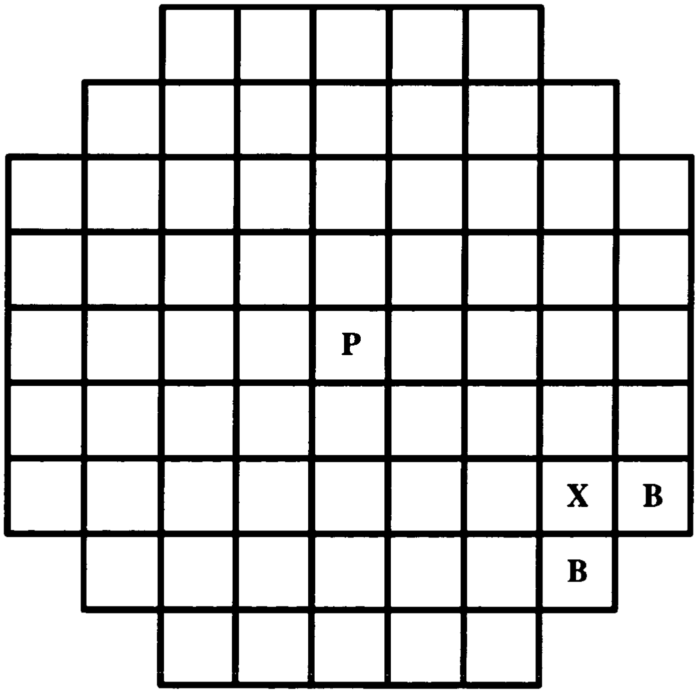
Figure 13J:
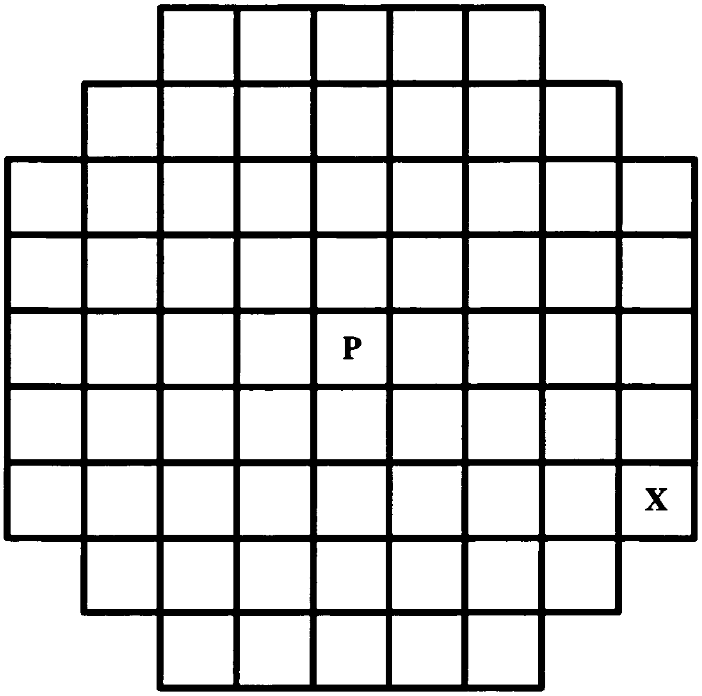
Figure 13K:
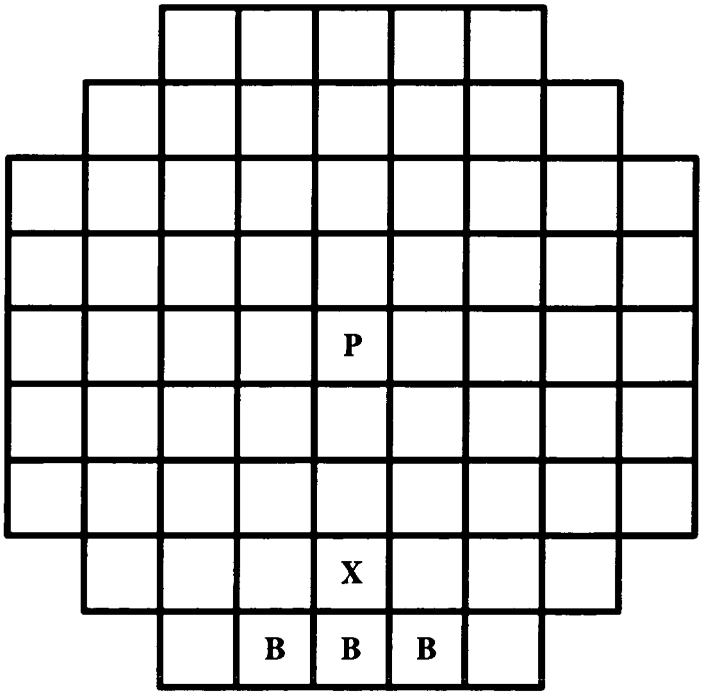
Figure 13L:
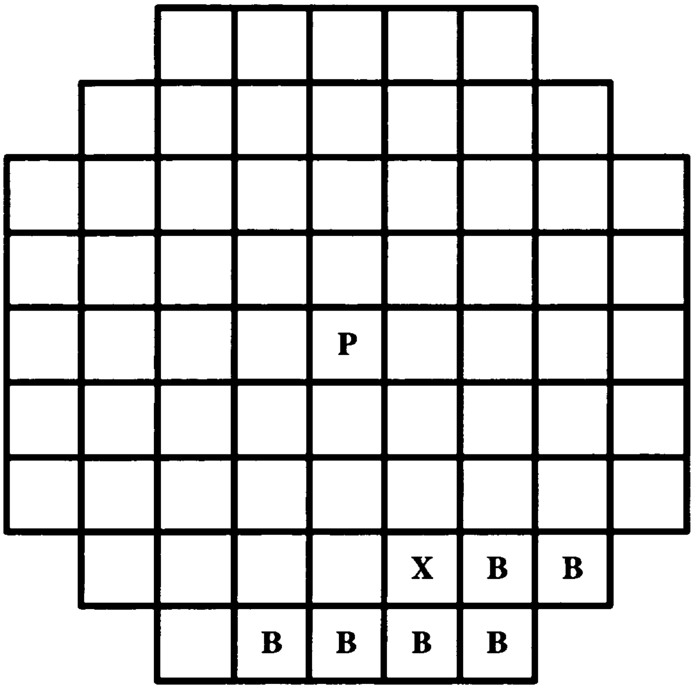
Figure 13M:
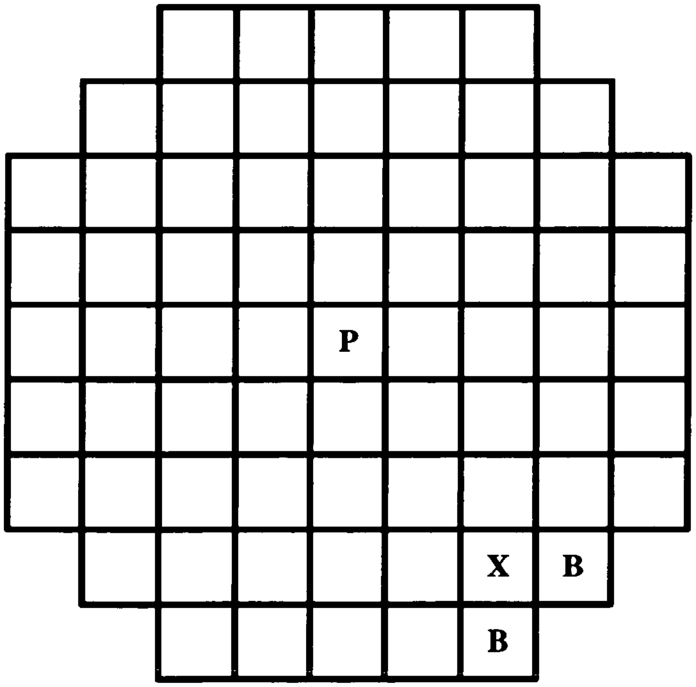
Figure 13N:
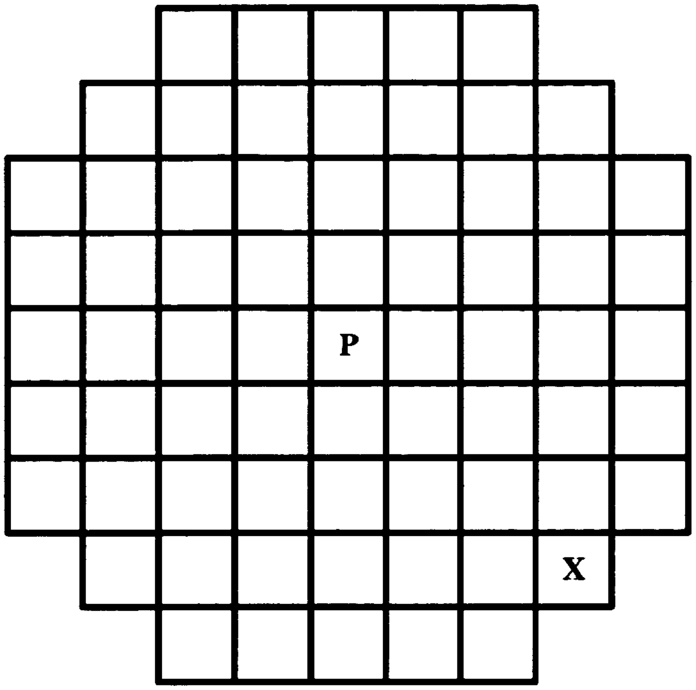
Figure 13O:
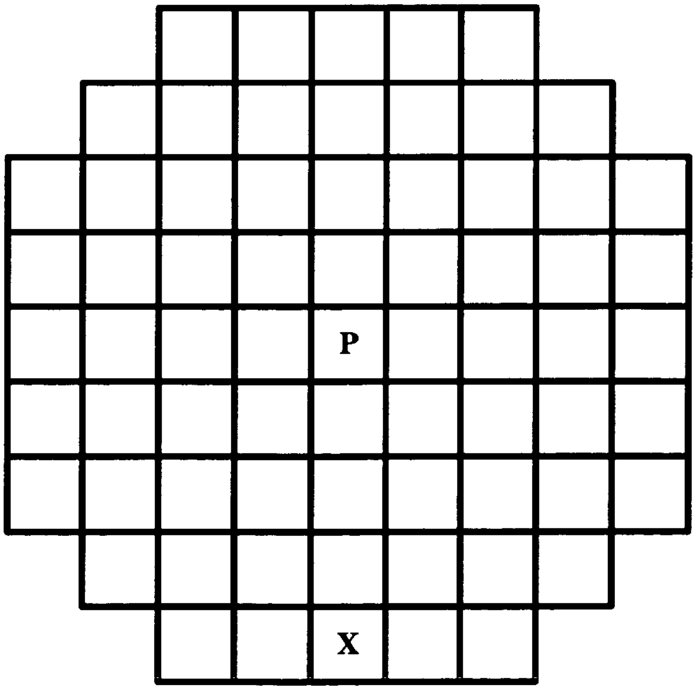
Figure 13P:
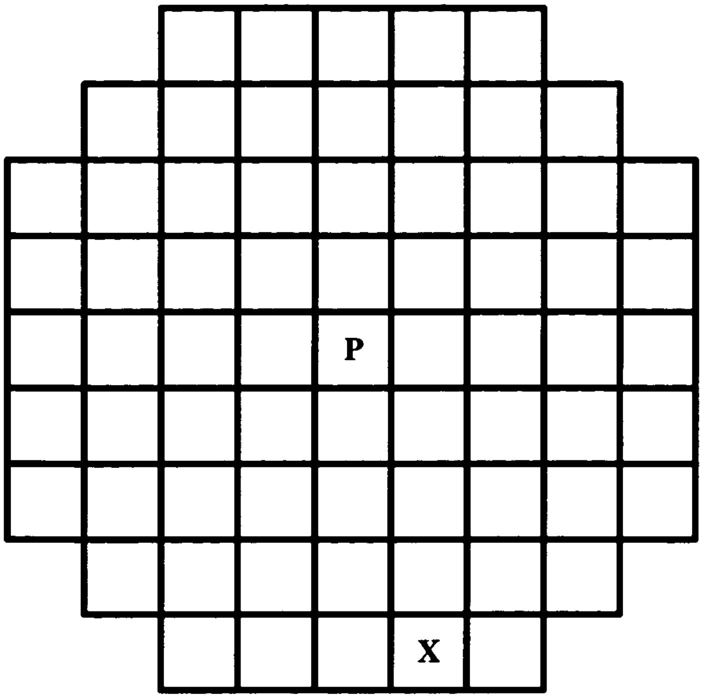
Figure 13Q:
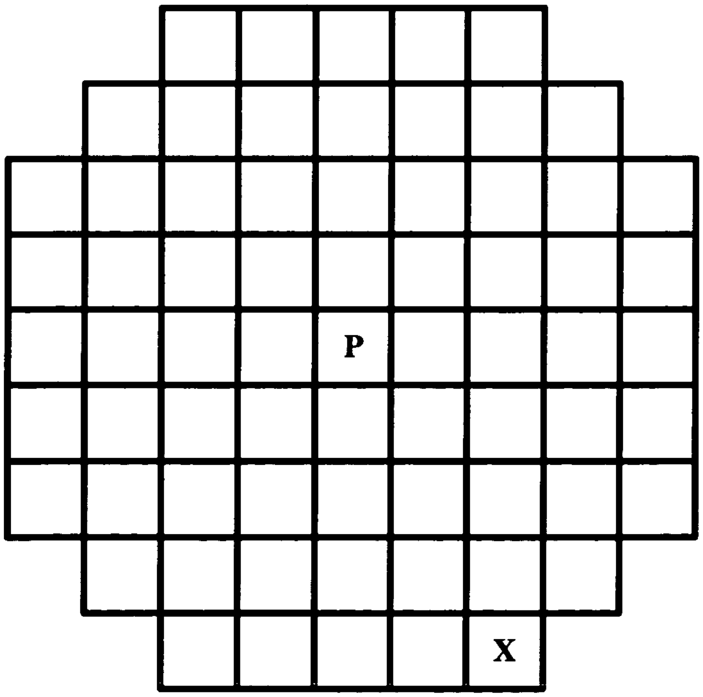

Referring now to FIGS. 13A-13Q, exemplary beyond pixels for the trapping window of FIG. 5D are described. In each figure, pixel P represents the pivot pixel, and pixel X represents a pixel whose beyond region includes pixels B. The monotonic property of the beyond regions may be seen for example in FIGS. 13B and 13C. Pixel X in FIG. 13C is in the beyond region of pixel X in FIG. 13B. As a result, pixels B in FIG. 13C are also in the beyond region of pixels X in FIG. 13B.

Figure 14:
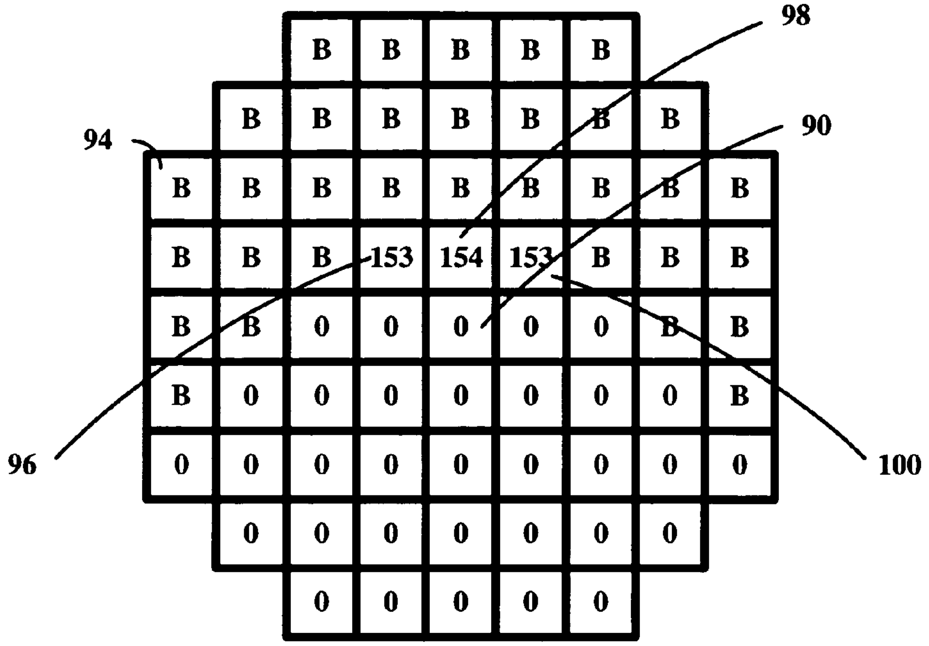
FIG. 14 illustrates the region of interest of FIG. 8 including beyond pixels in accordance with this invention.

Referring now to FIG. 14, the beyond pixels B are shown in exemplary region of interest 94. All beyond pixels are removed from further consideration in the trapping process. In this regard, a "beyond flag" may be set for each pixel in region of interest 94, with the flag having one value (e.g., zero) for pixels that are not beyond pixels, or a second value (e.g., one) for pixels that are beyond pixels. Alternatively, the trigger values of all beyond pixels could be reset to zero. Persons of ordinary skill in the art will understand that other similar techniques may be used to remove beyond pixels from further consideration in the trapping process.

At this point, all pixels in the region of interest 94 except pixels 96, 98 and 100 are either similar to pivot pixel 90, have a distance-adjusted trigger value less than $T_{THRESH}$, or are beyond pixels. Referring again to FIG. 4, at step 74, the maximum distance-adjusted trigger value is identified, referred to herein as $T_{MAX}$. In the example of FIG. 14, pixel 98 is identified as the pixel having the maximum distance-adjusted trigger $T_{MAX}$ value of 154, and is referred to herein as the "Trigger Pixel." Referring again to FIG. 4, at step 76, if $T_{MAX}$ is greater than $T_{THRESH}$, trapping is performed on the colorant values of pivot pixel 90 (i.e., C=0, M=0, Y=0, K=128) based on the colorant values of Trigger Pixel 98 (i.e., C=0, M=77, Y=0, K=0). In this regard, the trap is "pulled" from Trigger Pixel 98 to pivot pixel 90. For example, the colorant values of pivot pixel 90 may be modified based on differences between the colorant values of pivot pixel 90 and Trigger Pixel 98.

At step 78, a determination is made as to whether pivot pixel 90 is the last pixel of the page. If the answer is NO, at step 82, pivot pixel 90 is incremented to the next pixel in the image (e.g., the next pixel in the row currently being evaluated, or the first pixel in the next row if the current pixel is the last pixel in a row). If, however, the answer is YES, the process proceeds to step 80, at which a determination is made as to whether the current page being evaluated is the final page of the image. If the answer is NO, at step 84, the page is incremented, and pivot pixel 90 is reset to the first pixel of the page. If, however, the answer is YES, the process terminates. In this regard, all pixels in print image data 36 are evaluated for trapping.

Figure 15:
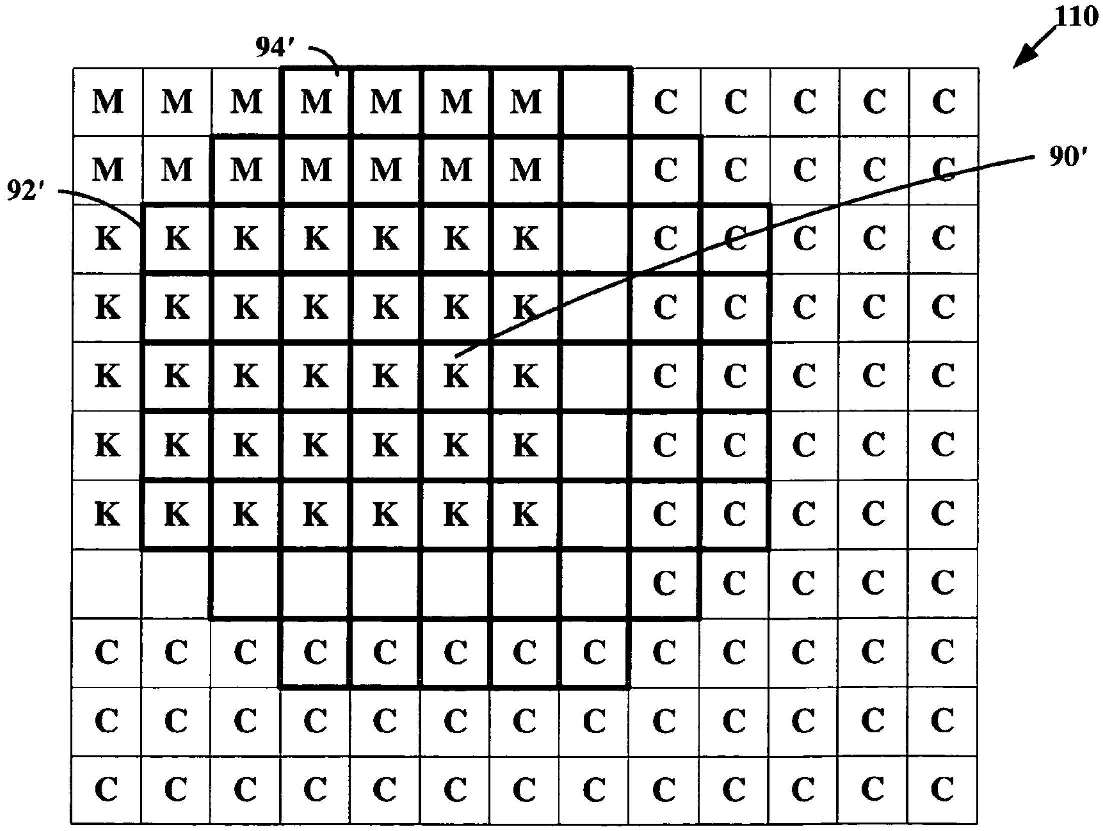
FIG. 15 illustrates another exemplary region of interest in accordance with this invention.

Referring now to FIGS. 4 and 15, another example of pull trapping process 60 is described. Array 110 is another exemplary portion of print image data 36. At step 64, an array of buffered data is selected. Pixel 90', located at row 5, column 6 of array 110, is selected as a pivot pixel that will be evaluated for trapping. A circular shaped trapping window 92', with a=4 and b=4, is aligned with pivot pixel 90', and defines a region of interest 94'. The pixel data included in region of interest 94' are buffered. Region of interest 94' includes M pixels (C=0, M=77, Y=0, K=0), K pixels (C=0, M=0, Y=0, K=128) including pivot pixel 90', white pixels (C=M=Y=K=0), and C pixels (C=102, M=0, Y=0, K=0).

Figure 18:
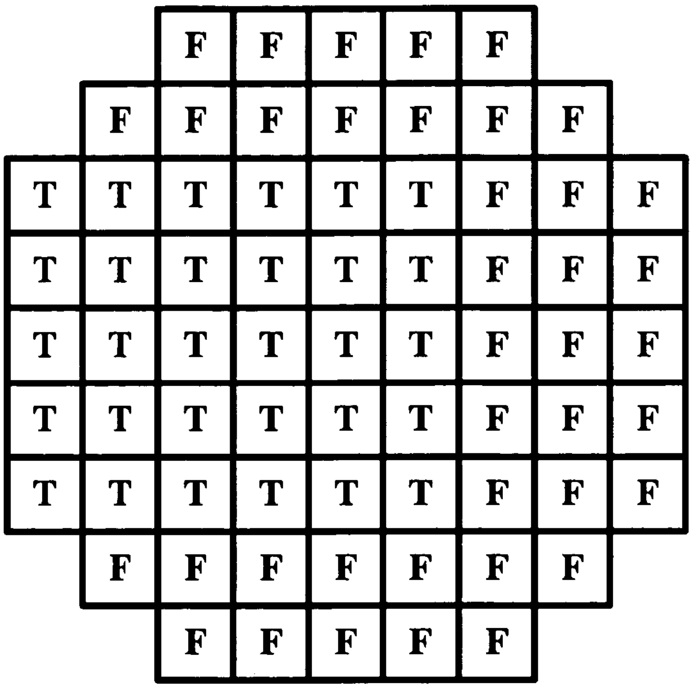
FIG. 18 illustrates exemplary similar flags for the region of interest of FIG. 15 in accordance with this invention.

Referring again to FIG. 4, at step 66, the trigger function is evaluated for each pixel in the region of interest. FIG. 16 illustrates exemplary trigger values in region of interest 94', calculated using the exemplary trigger function of equation (2) and pivot pixel 90'. Referring again to FIG. 4, at step 68, each of the trigger values are adjusted according to their distance from pivot pixel 90'. FIG. 17 illustrates distance-adjusted trigger values for region of interest 94' using equation (5) and the exemplary values of Offset(x) from FIG. 9. Referring again to FIG. 4, at step 70, pixels that are similar to the pivot pixel are identified. FIG. 18 illustrates similar flags for the pixels of region of interest 94', using $T_{SIM}$=4.

Figure 19:
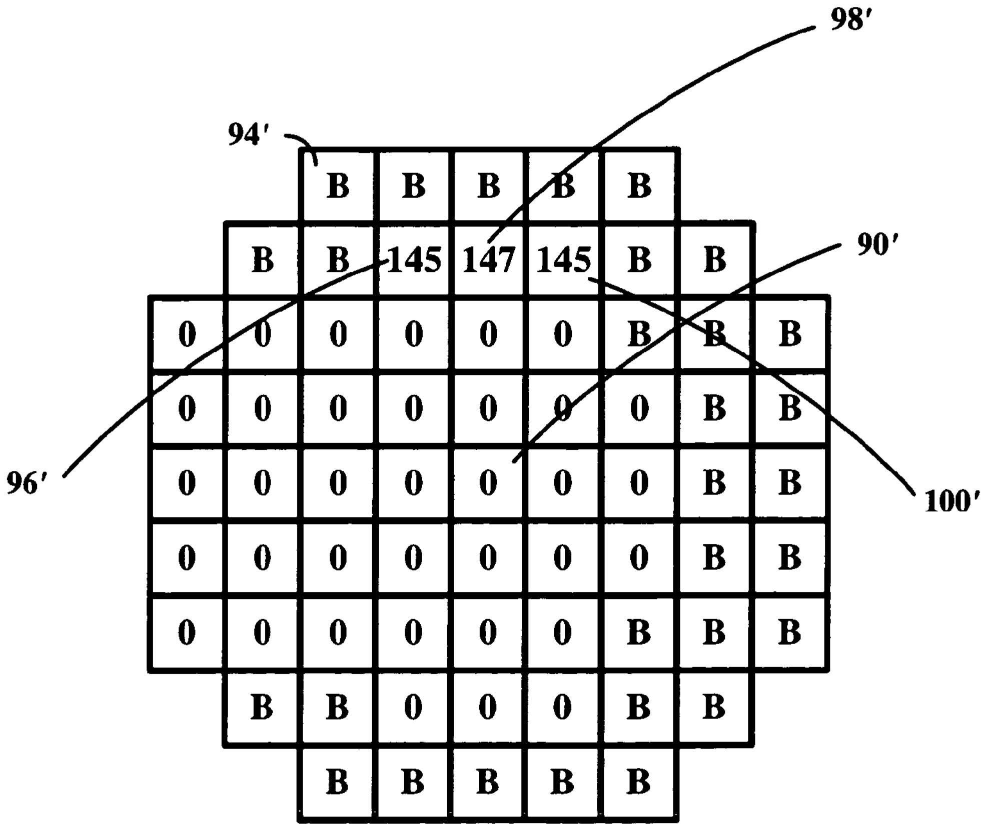
FIG. 19 illustrates the region of interest of FIG. 15 including beyond pixels in accordance with this invention.

Referring again to FIG. 4, at step 72, the beyond pixels in region of interest 94' are identified. FIG. 19 illustrates the beyond pixels B in exemplary region of interest 94'. In this example, all pixels in the region of interest 94' except pixels 96', 98' and 100' are either similar to pivot pixel 90', have a distance-adjusted trigger value less than $T_{THRESH}$, or are beyond pixels. Referring again to FIG. 4, at step 74, the maximum distance-adjusted trigger value $T_{MAX}$ is identified. In the example of FIG. 19, pixel 98' is identified as the Trigger Pixel, having the maximum distance-adjusted trigger value $T_{MAX}$ of 147. Referring again to FIG. 4, at step 76, if $T_{MAX}$ is greater than $T_{THRESH}$, trapping is performed on the colorant values of pivot pixel 90' (i.e., C=0, M=0, Y=0, K=128) based on the colorant values of Trigger Pixel 98' (i.e., C=0, M=77, Y=0, K=0). In this regard, the trap is "pulled" from Trigger Pixel 98' to pivot pixel 90.' Process 60 then continues for the other remaining pixels in print image data 36.

Figure 20:
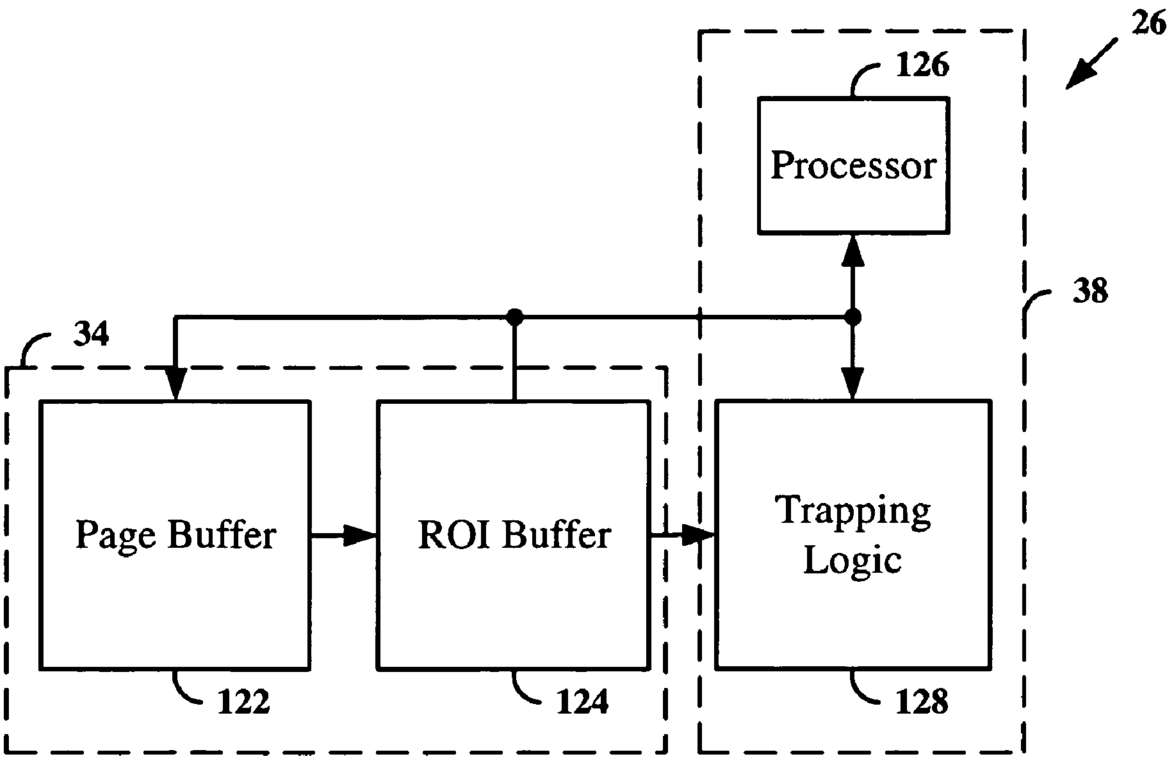
FIG. 20 is a block diagram of exemplary trapping apparatus in accordance with this invention.

Referring now to FIGS. 2 and 20, an exemplary trapping unit 26 in accordance with this invention is described. Trapping unit 26 includes buffer 34 for storing print image data 36, and logic 38 that implements pull trapping methods in accordance with this invention. Buffer 34 includes page buffer 122 and region of interest buffer 124. Page buffer 122 may be any conventional memory, such as random access memory, read-only memory, optical memory, floppy disk, hard disk, field programmable gate array or other similar memory device, that may be used to store a page of print image data 36. ROI buffer 124 may be any conventional memory, such as random access memory, read-only memory, optical memory, floppy disk, hard disk, field programmable gate array or other similar memory device, that may be used to store the pivot pixel and the additional pixels surrounding the pivot pixel that comprise the ROI.

Logic 38 includes processor 126 and trapping logic 128. Processor 126 may be any conventional computer processor, such as a personal computer, laptop computer, handheld computer, general purpose microprocessor, application-specific integrated circuit processor, field programmable gate array or other similar processing device that may be used to control data flow between, and the operation of, page buffer 122, ROI buffer 124 and trapping logic 128. Trapping logic 128 may be a personal computer, laptop computer, handheld computer, general purpose microprocessor, application-specific integrated circuit processor, field programmable gate array or other similar processing device that may be used perform pull trapping steps in accordance with this invention. Persons of ordinary skill in the art will understand that page buffer 122, ROI buffer 124, processor 126 and trapping logic 128 each may be implemented on separate hardware and/or software, or may be combined in one or more hardware and/or software devices.

Figure 21A:
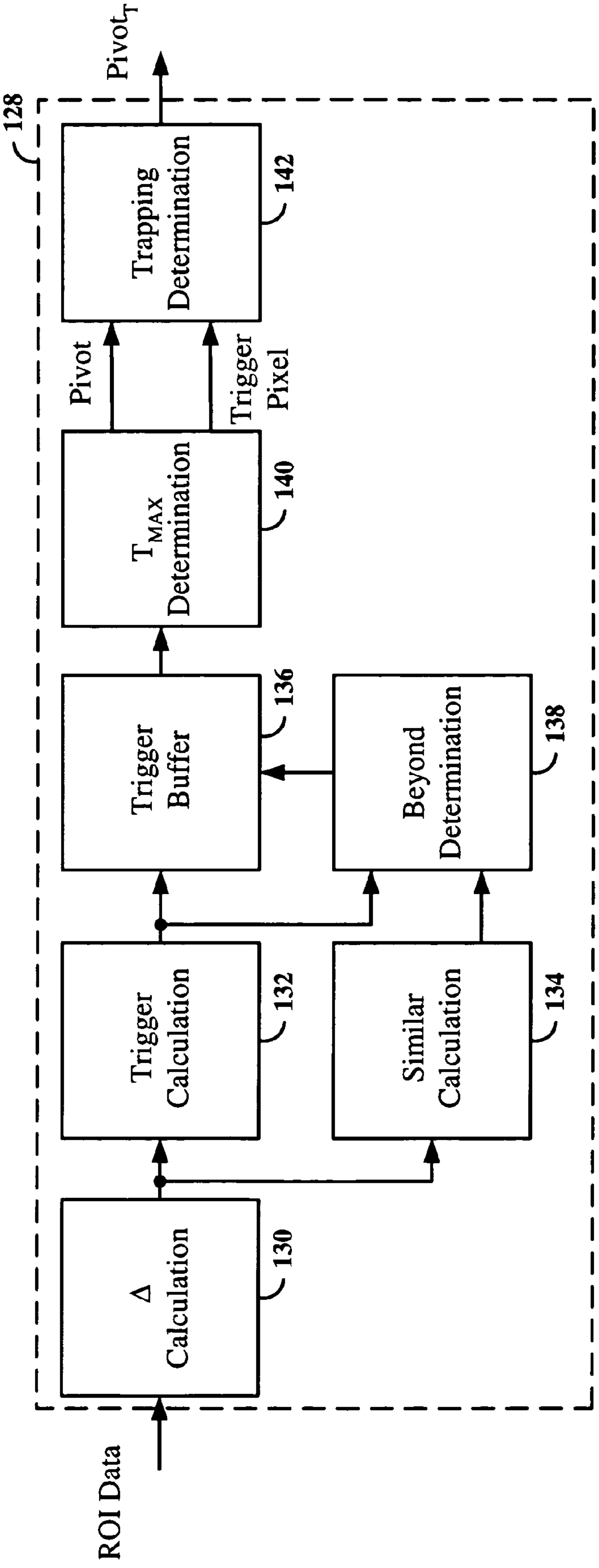
FIG. 21A is a block diagram of an exemplary pipeline processing implementation of the trapping logic circuit of FIG. 20.

In addition, trapping logic 128 may be implemented using pipelined processing techniques to reduce the time required to perform pull trapping steps in accordance with this invention. Referring now to FIG. 21, an exemplary pipelined implementation of trapping logic 128 is described. As shown in FIG. 21A, trapping logic 128 receives region of interest data, and includes a series of processing stages, each of which performs a single operation. In particular, trapping logic 128 includes Δ Calculation stage 130, Trigger Calculation stage 132, Similar Calculation stage 134, Trigger Buffer 136, Beyond Determination stage 138, $T_{MAX}$ Determination stage 140, and Trapping Determination stage 142. In accordance with known pipelined processing techniques, each of stages 130-142 operates under control of a digital clock signal, and the output of each stage is gated before being provided to the subsequent stage on the next clock cycle.

FIG. 21B illustrates the timing operation of trapping logic 128. In particular, during a first clock cycle, A Calculation stage 130 receives pixel data for region of interest ROI(i), including pivot pixel Pivot(i), and calculates colorant difference values for pixels in ROI(i) in accordance with equation (4). In the second clock cycle, Trigger Calculation stage 132 and Similar Calculation stage 134 each receive the colorant difference values for ROI(i) calculated during the first clock cycle, and Δ Calculation stage 130 receives pixel data for region of interest ROI(i+1), including pivot pixel Pivot(i+1), where Pivot(i+1) is the next successive pixel in page buffer 122 and ROI(i+1) is the next successive region of interest in ROI buffer 124. Also during the second clock cycle, Trigger Calculation stage 132 calculates distance-adjusted trigger values for pixels in ROI(i) in accordance with equations (2) and (5), and Similar Calculation stage 134 determines similar flags for pixels in ROI(i) in accordance with equation (7).

In the third clock cycle, Trigger Buffer 136 receives the distance-adjusted trigger values for pixels in ROI(i) calculated during the second clock cycle, Beyond Determination stage 138 receives the distance-adjusted trigger values and the similar flags for pixels in ROI(i) calculated during the second clock cycle, Trigger Calculation stage 132 and Similar Calculation stage 134 each receive the colorant difference values for ROI(i+1) calculated during the second clock cycle, and A Calculation stage 130 receives pixel data for region of interest ROI(i+2), including pivot pixel Pivot(i+2), where Pivot(i+2) is the next successive pixel in page buffer 122 and ROI(i+2) is the next successive region of interest in ROI buffer 124. Also during the third clock cycle, Beyond Determination stage 138 determines the beyond pixels for pixels in ROI(i) as described above, and accordingly resets the distance-adjusted trigger values in Trigger Buffer 136 for beyond pixels in ROI(i).

In the fourth clock cycle, $T_{MAX}$ Determination stage 140 receives the distance-adjusted trigger values for pixel in ROI (i) calculated during the third clock cycle, Trigger Buffer 136 receives the distance-adjusted trigger values for pixels in ROI(i+1) calculated during the third clock cycle, Beyond Determination stage 138 receives the distance-adjusted trigger values and the similar flags for pixels in ROI(i+1) calculated during the third clock cycle, Trigger Calculation stage 132 and Similar Calculation stage 134 each receive the colorant difference values for ROI(i+2) calculated during the third clock cycle, and Δ Calculation stage 130 receives pixel data for region of interest ROI(i+3), including pivot pixel Pivot(i+3), where Pivot(i+3) is the next successive pixel in page buffer 122 and ROI(i+3) is the next successive region of interest in ROI buffer 124. Also during the fourth clock cycle, $T_{MAX}$ Determination stage 140 identifies the maximum distance-adjusted trigger value $T_{MAX}(i)$ and the corresponding Trigger Pixel(i) for ROI(i).

In the fifth clock cycle, Trapping Determination stage 142 receives colorant values of pivot pixel Pivot(i) and Trigger Pixel(i) for ROI(i) identified during the fourth clock cycle, $T_{MAX}$ Determination stage 140 receives the distance-adjusted trigger values for pixel in ROI(i+1) calculated during the fourth clock cycle, Trigger Buffer 136 receives the distance-adjusted trigger values for pixels in ROI(i+2) calculated during the fourth clock cycle, Beyond Determination stage 138 receives the distance-adjusted trigger values and the similar flags for pixels in ROI(i+2) calculated during the fourth clock cycle, Trigger Calculation stage 132 and Similar Calculation stage 134 each receive the colorant difference values for ROI(i+3) calculated during the fourth clock cycle, and Δ Calculation stage 130 receives pixel data for region of interest ROI(i+4), including pivot pixel Pivot(i+4), where Pivot(i+4) is the next successive pixel in page buffer 122 and ROI(i+4) is the next successive region of interest in ROI buffer 124. Also during the fifth clock cycle, Trapping Determination stage 142 performs trapping on the colorant values of pivot pixel Pivot(i) based on the colorant values of Trigger Pixel(i), and provides trapped pivot pixel $Pivot_T(i)$. Thus, each stage of exemplary trapping logic 128 operates in lockstep fashion with the other stages, and trapping calculations are concurrently performed with respect to five different regions of interest to reduce the time required to trap print image data 36.

Figure 22A:
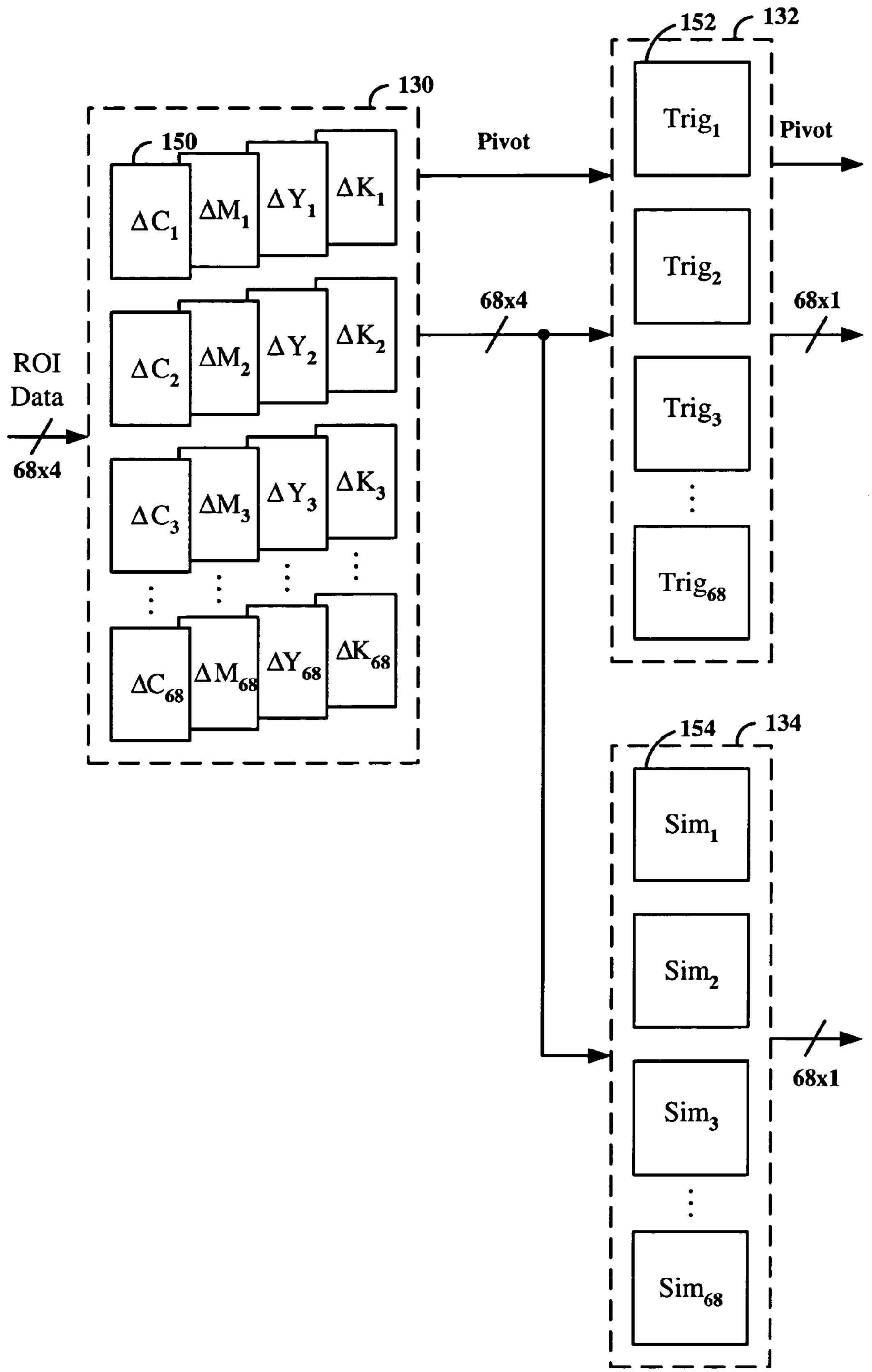
FIG. 22 is a block diagram of an exemplary parallel processing implementation of the pipelined stages of FIG. 21.

To further reduce the time required to perform pull trapping steps in accordance with this invention, the various stages of trapping logic 128 may be implemented using parallel processing techniques. Referring now to FIG. 22, an exemplary parallel processing implementation of the stages of FIG. 21A is described. In this example, the trapping circuitry processes data in a region of interest defined using the trapping window shown in FIG. 5D, which includes sixty-eight pixels surrounding pivot pixel Pivot, with each pixel including C, M, Y and K colorants. Accordingly, as shown in FIG. 22A, the input to Δ Calculation stage 130 includes two hundred seventy-two (68×4=272) data lines for each region of interest. Further, Δ Calculation stage 130 includes two hundred seventy-two differencing circuits 150, where each differencing circuit 150 calculates the colorant difference for a single colorant of a single pixel in the region of interest.

The output of Δ Calculation stage 130 includes pivot pixel Pivot and the two hundred seventy-two colorant differences for the pixels that surround Pivot. Trigger Calculation stage 132 receives the outputs of Δ Calculation stage 130, and includes sixty-eight trigger calculation circuits 152 that each calculate a distance-adjusted trigger value for a corresponding one of the sixty-eight pixels in the region of interest. The output of Trigger Calculation stage 132 includes pivot pixel Pivot and the sixty-eight distance-adjusted trigger values. Similar Calculation stage 134 receives the two hundred seventy-two colorant differences from Δ Calculation stage 130, and includes sixty-eight similar calculation circuits 154 that each determine the similar flag for a corresponding one of the sixty-eight pixels in the region of interest. The output of Similar Calculation stage 134 includes the sixty-eight similar flags.

Figure 22B:
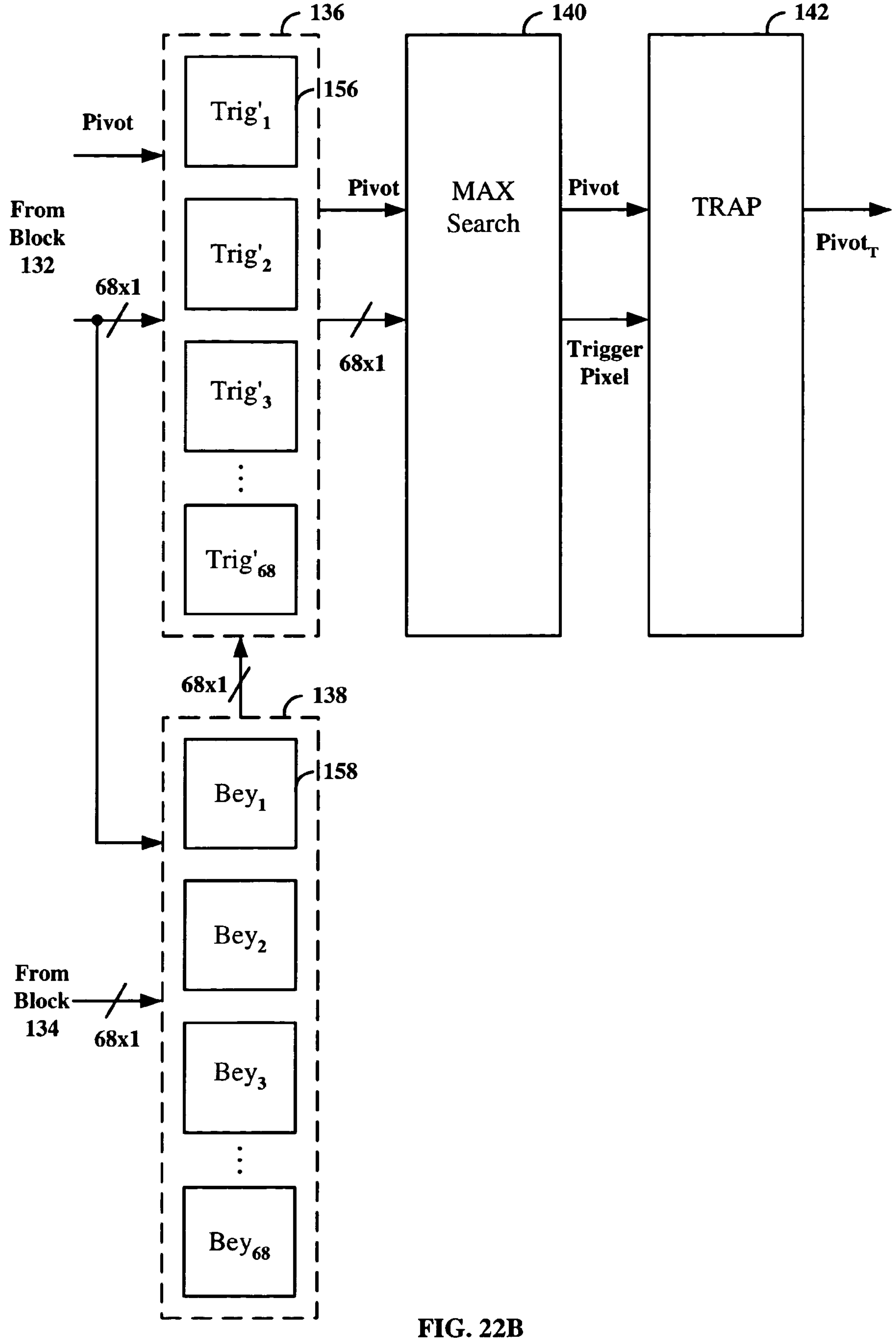

As shown in FIG. 22B, Trigger Buffer stage 136 receives the outputs of Trigger Calculation stage 132, and includes sixty-eight memory circuits 156 that each store a corresponding one of the sixty-eight trigger values. Beyond Determination stage 138 receives the outputs of Trigger Calculation stage 132 and Similar Calculation stage 134, and includes sixty-eight beyond circuits 156 that each determine the beyond status of a corresponding one of the sixty-eight trigger values. The output of Beyond Determination stage 138 is used to modify the sixty-eight trigger values stored in Trigger buffer stage 136. The output of Trigger buffer stage 136 includes pivot pixel Pivot and the sixty-eight modified trigger values. $T_{MAX}$ Determination stage 140 receives the pivot pixel Pivot and the sixty-eight modified trigger values, and identifies the maximum distance-adjusted trigger value $T_{MAX}$ and the corresponding Trigger Pixel. Trapping Determination stage 142 receives pivot pixel Pivot and Trigger Pixel and performs trapping based on the colorant values of the Trigger Pixel. The output of Trapping Determination stage 142 is the trapped pivot pixel $Pivot_T$.

The foregoing merely illustrates the principles of this invention, and persons of ordinary skill in the art can make various modifications without departing from the scope and spirit of this invention.

We claim:

1. A computer-implemented method for electronically trapping a first digital color image pixel comprising a plurality of colorant values, the method comprising:

identifying, with a computer, a trapping window comprising a plurality of pixels that surround the first pixel, each of the surrounding pixels comprising a plurality of colorant values;

determining, with the computer, a difference between a sum of magnitudes of differences between colorant values of each of the surrounding pixels and corresponding colorant values of the first pixel, and a magnitude of a sum of differences between colorant values of each of the surrounding pixels and corresponding colorant values of the first pixels to obtain a trigger value for each of the surrounding pixels;

adjusting, with the computer, the trigger values according to the distance between the first pixel and each surrounding pixel to obtain a distance adjusted trigger value for each of the surrounding pixels;

comparing, with the computer, the adjusted trigger values for each of the surrounding pixels to a trigger threshold;

identifying, with a computer, any of the surrounding pixels where the adjusted trigger value for the surrounding pixel exceeds the trigger threshold;

identifying, with the computer, a trigger pixel from the surrounding pixels with the adjusted trigger value that exceeds the trigger threshold with a maximum trigger value; and trapping, with the computer, the first pixel based on colorant values of the first pixel and a colorant values of the trigger pixel.

2. The method of claim 1, wherein the trapping window comprises a circular shape.

3. The method of claim 1, wherein the trapping window comprises an elliptical shape.

4. The method of claim 1, wherein each pixel that exceeds the trigger threshold indicates an edge that requires trapping.

5. The method of claim 1, wherein the step of trapping pulls a trap from the trigger pixel to the first pixel.

6. The method of claim 1, wherein the colorant values comprise cyan, magenta, yellow and black colorants.

7. An apparatus for electronically trapping a first digital color image pixel comprising a plurality of colorant values, the apparatus comprising:

means for identifying a trapping window comprising a plurality of pixels that surround the first pixel, each of the surrounding pixels comprising a plurality of colorant values;

means for determining a difference between a sum of magnitudes of differences between colorant values of each of the surrounding pixels and corresponding colorant values of the first pixel, and a magnitude of a sum of differences between colorant values of each of the surrounding pixels and corresponding colorant values of the first pixel to obtain a trigger value for each of the surrounding pixels;

means for adjusting the trigger values according to the distance between the first pixel and each surrounding pixel to obtain a distance adjusted trigger value for each of the surrounding pixels;

means for comparing the adjusted trigger values for each of the surrounding pixels to a trigger threshold;

means for identifying any of the surrounding pixels where the adjusted trigger value for the pixel exceeds the trigger threshold;

means for identifying a trigger pixel from the surrounding pixels with the adjusted trigger value that exceeds the trigger threshold with a maximum colorant difference value; and means for trapping the first pixel based on colorant values of the first pixel and colorant values of the trigger pixel.

8. The apparatus of claim 7, wherein the trapping window comprises a circular shape.

9. The apparatus of claim 7, wherein the trapping window that comprises an elliptical shape.

10. The apparatus of claim 7, wherein each pixel that exceeds the trigger threshold indicates an edge that requires trapping.

11. The apparatus of claim 7, wherein the means for trapping pulls a trap from the trigger pixel to the first pixel.

12. The apparatus of claim 7, wherein the colorant values comprise cyan, magenta, yellow and black colorants.

* * * * *

UNITED STATES PATENT AND TRADEMARK OFFICE
CERTIFICATE OF CORRECTION

PATENT NO. : 7,672,013 B2
APPLICATION NO. : 10/718211
DATED : March 2, 2010
INVENTOR(S) : Yigal Accad et al.

It is certified that error appears in the above-identified patent and that said Letters Patent is hereby corrected as shown below:

On the Title page, in field (73), under "Assignee", delete "Electroncics" and insert -- Electronics --, therefor.

On Sheet 3 of 25, in FIG. 4, Reference Numeral 62, line 1, delete "Intitialize" and insert -- Initialize --, therefor.

In column 11, line 26, delete "A" and insert -- Δ --, therefor.

In column 11, line 50, delete "A" and insert -- Δ --, therefor.

In column 14, line 2, in claim 1, before "colorant" delete "a".

In column 14, line 47, in claim 9, before "comprises" delete "that".

Signed and Sealed this

Twelfth Day of October, 2010

David J. Kappos

David J. Kappos
*Director of the United States Patent and Trademark Office*